US012099827B2

(12) United States Patent
Koike et al.

(10) Patent No.: US 12,099,827 B2
(45) Date of Patent: Sep. 24, 2024

(54) INFORMATION PROCESSING SYSTEM, INFORMATION PROCESSING APPARATUS, AND STORAGE MEDIUM

(71) Applicant: CANON KABUSHIKI KAISHA, Tokyo (JP)

(72) Inventors: Hiroaki Koike, Tokyo (JP); Atsushi Ikeda, Ibaraki (JP); Takeshi Kogure, Ibaraki (JP); Sora Kumagai, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 232 days.

(21) Appl. No.: 17/889,584

(22) Filed: Aug. 17, 2022

(65) Prior Publication Data
US 2023/0074397 A1    Mar. 9, 2023

(30) Foreign Application Priority Data

Aug. 30, 2021  (JP) ................................. 2021-139942

(51) Int. Cl.
*G06F 8/65* (2018.01)
*G06F 8/30* (2018.01)

(52) U.S. Cl.
CPC ................ *G06F 8/65* (2013.01); *G06F 8/311* (2013.01)

(58) Field of Classification Search
USPC ....................................................... 717/168
See application file for complete search history.

(56) References Cited

U.S. PATENT DOCUMENTS

| 2004/0117784 A1* | 6/2004 | Endoh | G06F 21/10 717/169 |
| 2006/0026105 A1* | 2/2006 | Endoh | G06F 21/1079 705/59 |
| 2008/0244057 A1* | 10/2008 | Kojima | H04L 67/34 709/223 |
| 2010/0058482 A1* | 3/2010 | Nagumo | H04N 1/00962 726/26 |
| 2010/0212026 A1* | 8/2010 | Yoshimura | H04N 1/00344 718/1 |
| 2011/0010649 A1* | 1/2011 | Watanabe | G06F 11/36 715/764 |
| 2015/0026827 A1* | 1/2015 | Kao | G06F 21/125 726/29 |

(Continued)

FOREIGN PATENT DOCUMENTS

| JP | 2003307422 A | 10/2003 |
| JP | 2016024701 A | 2/2016 |
| JP | 2018018501 A | 2/2018 |

*Primary Examiner* — Qing Chen
*Assistant Examiner* — Clint Thatcher
(74) *Attorney, Agent, or Firm* — Canon U.S.A., Inc., IP Division

(57) ABSTRACT

An information processing system that provides an application to be executed on an image processing apparatus, the information processing system includes one or more controllers configured to provide, as a first combination application, combination information regarding a reproduction application that reproduces a description file defining an operation procedure, and a first description file, provide, as a second combination application, combination information regarding the reproduction application and a second description file, and output a license code associated with the first combination application and the second combination application.

18 Claims, 23 Drawing Sheets

(56) References Cited

U.S. PATENT DOCUMENTS

| | | | | |
|---|---|---|---|---|
| 2015/0358487 A1* | 12/2015 | Sugiyama | .......... | H04N 1/00973 |
| | | | | 358/1.15 |
| 2018/0039787 A1* | 2/2018 | Watariuchi | ............ | H04L 63/123 |
| 2020/0210057 A1* | 7/2020 | Yoshihashi | ............. | H04L 67/75 |

* cited by examiner

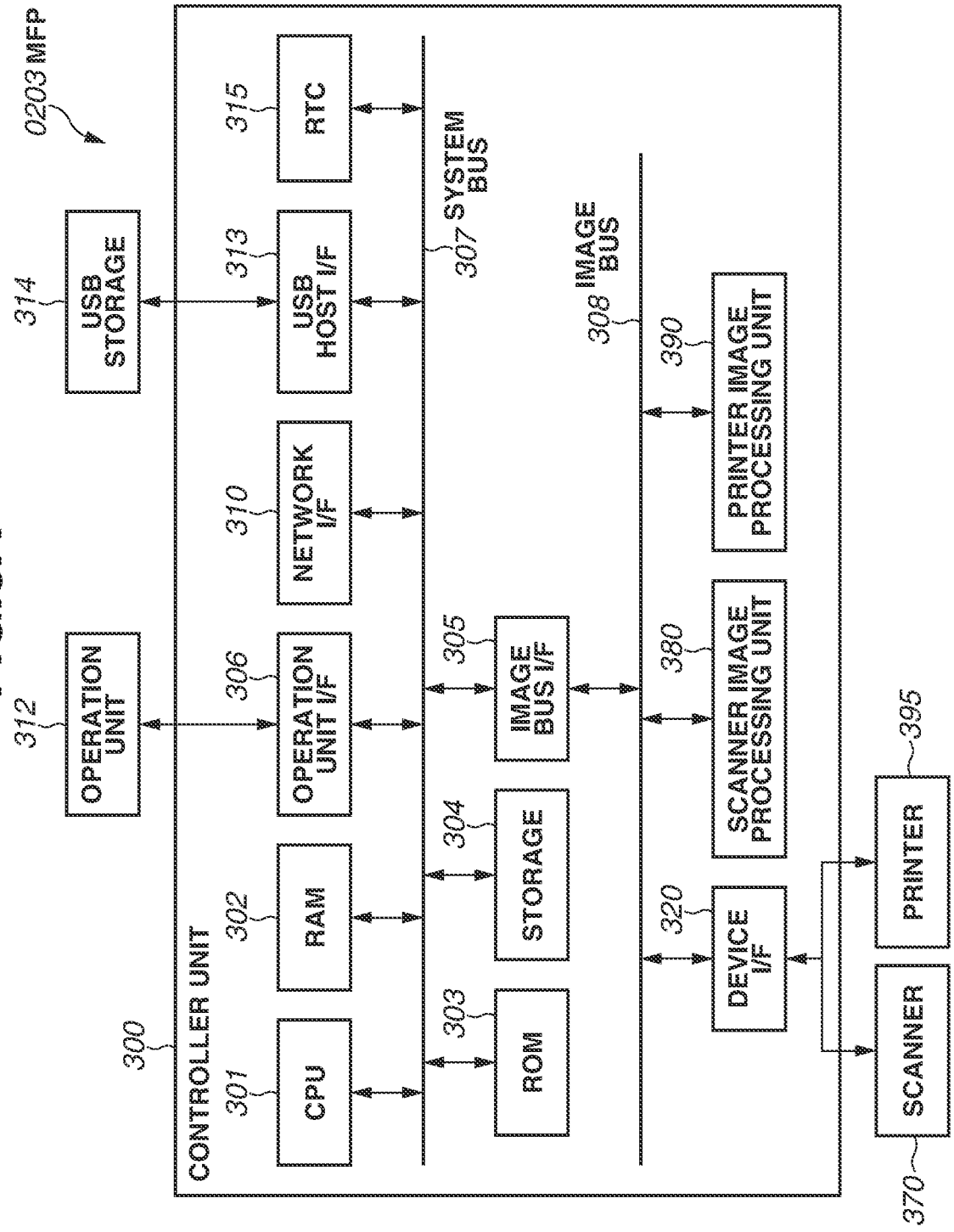

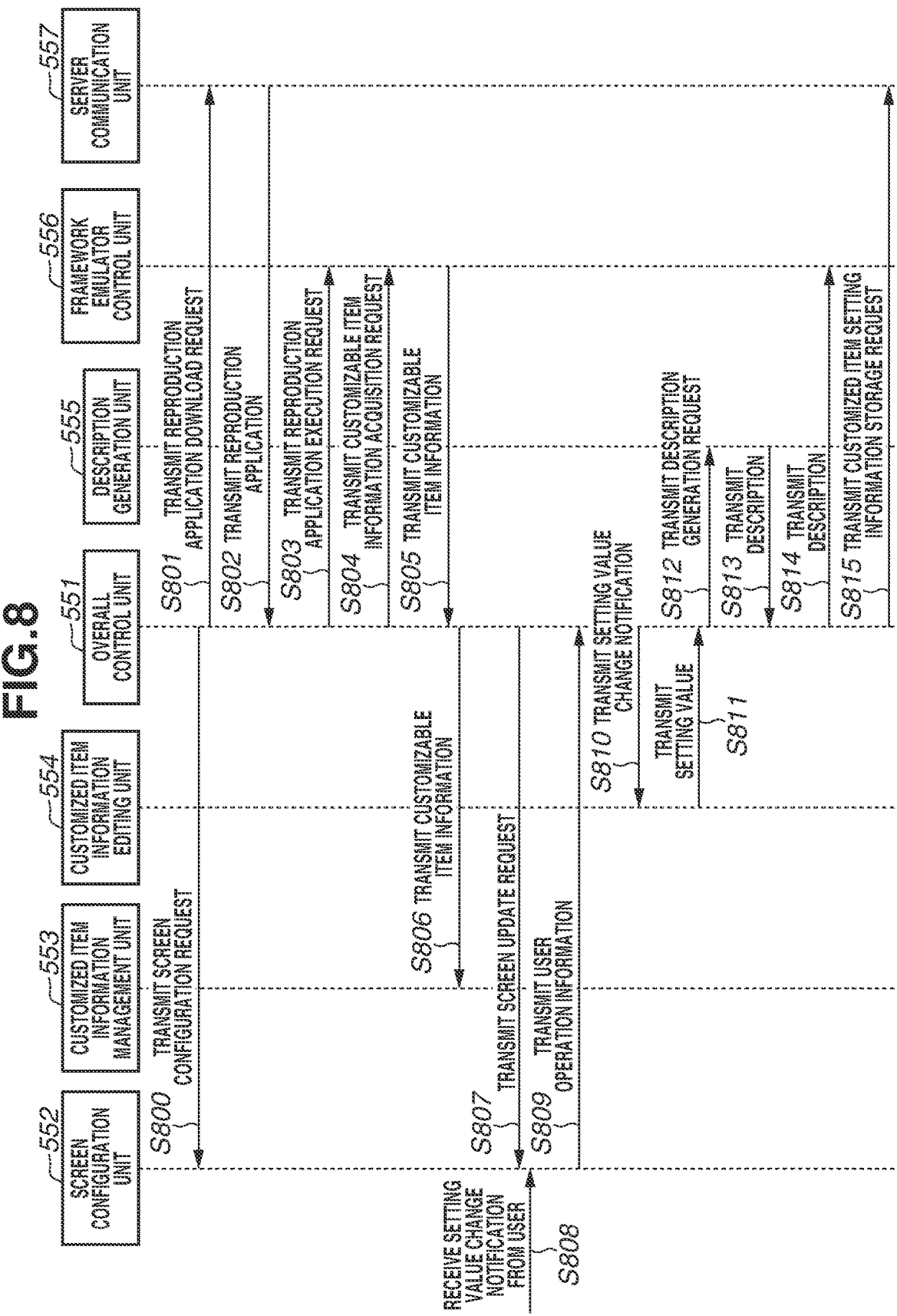

FIG.11A

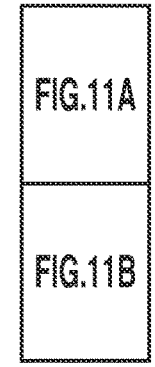

```
{
  "panel": {
    "panel1": [ ~1101
      { ~1103
        "id":"title", ~1104
        "attrib": { ~1105
          "title": { ~1106
            "data_type": "string", ~1107
            "data": { ~1108
              "ja": "Custom Application", "en": "Test Application"
            }
          }
        }
      },
      { ~1109
        "id": "message",
        "attrib": {
          "message": {
            "data_type": "string",
            "data": {
              "ja": "Run Copy. \n *Display "OK" in easy-to-touch manner", "en": "Run Copy."
            }
          }
        }
      },
      { ~1110
        "id": "button",
        "attrib": {
          "position": {
            "data_type": "position",
            "data": {
              "x": 0, "y": 280, "width": 200, "height": 200
            }
          },
          "name": {
            "data_type": "string",
            "data": {
              "ja": "OK", "en": "OK",
            }
          },
          "action": {
            "data_type": "change_panel",
            "data": {
              "next_panel": "panel2"
            }
          }
        }
      },
```

FIG.11B

```
{  ~1111
    "id": "button",
    "attrib": {
      "position": {
        "data_type": "position",
        "data": {
          "x": 700, "y": 480, "width": 100, "height": 30
        }
      },
      "name": {
        "data_type": "string",
        "data": {
          "ja": "Cancel", "en": "Cancel",
        }
      },
      "action": {
        "data_type": "change_panel",
        "data": {
          "next_panel": "exit"
        }
      }
    }
  }
],
"panel2": [ ~1102
  {
    "id" : "execute_job", ~1112
    "attrib": {
      "job": { ~1113
        "data_type": "job",
        "data": {
          "id": "copy", ~1114
          "job_attrib": { ~1115
            "copies": { ~1116
              "data_type": "int_100",
              "data": 1
            },
            "color_mode": { ~1117
              "data_type": "select",
              "data": "color"
            }
          }
        }
      },
      "action": {
        "data_type": "change_panel",
        "data": {
          "next_panel": "exit"
        }
      }
    }
  }
]
}
```

FIG.16

| INSTALL CODE | APPLICATION | INSTALL CODE EXPIRATION DATE |
|---|---|---|
| www1 - xxx1 - yyy1 - zzz1 | APPLICATION A<br>APPLICATION C<br>APPLICATION D | 2021/10/06 |
| www2 - xxx2 - yyy2 - zzz2 | APPLICATION B<br>APPLICATION D | 2021/11/15 |
| www3 - xxx3 - yyy3 - zzz3 | APPLICATION A<br>APPLICATION B<br>APPLICATION C | 2021/11/19 |
| ⋮ | ⋮ | |

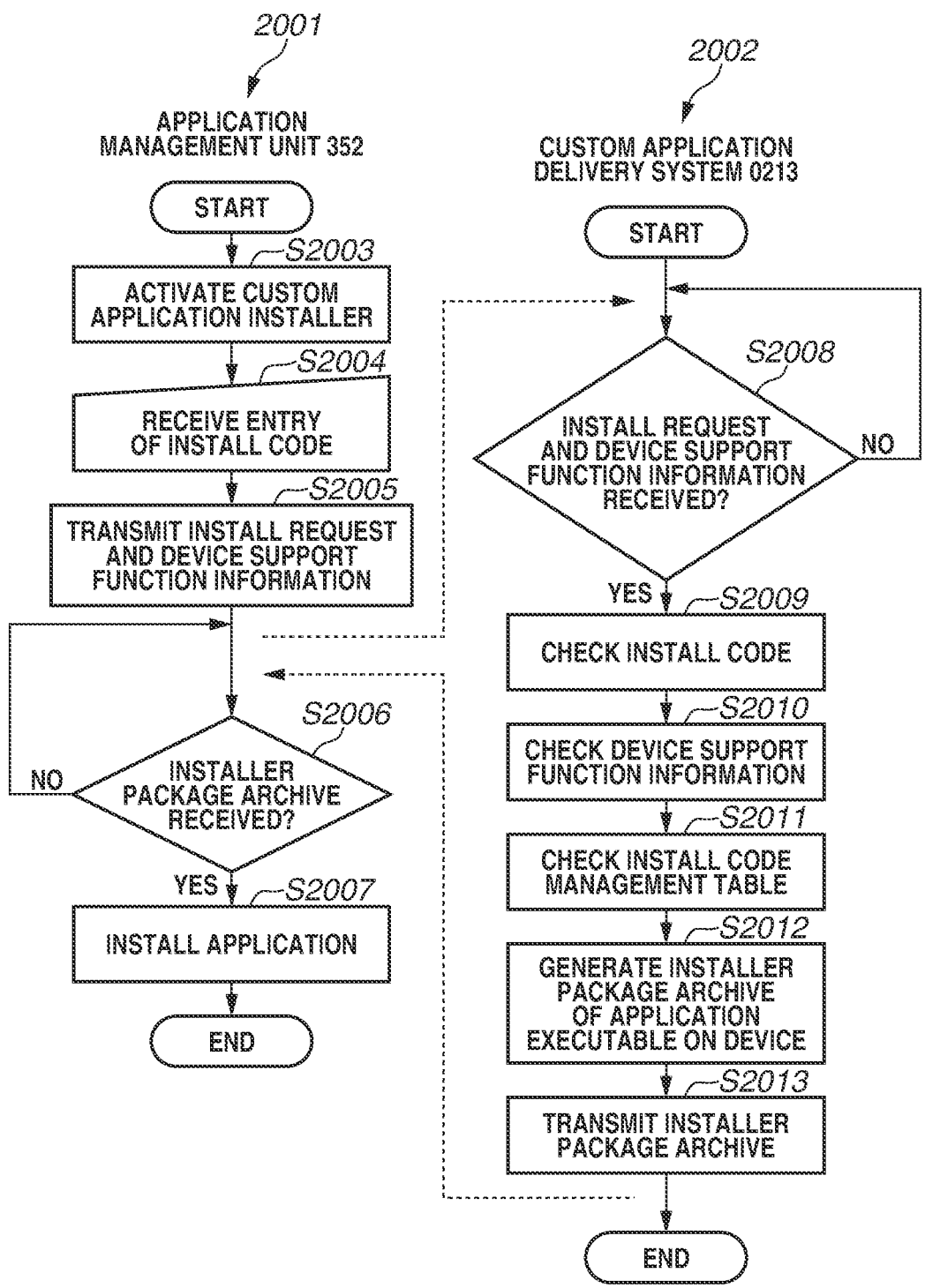

INFORMATION PROCESSING SYSTEM, INFORMATION PROCESSING APPARATUS, AND STORAGE MEDIUM

BACKGROUND

Field

The present disclosure relates to a system for editing an application to be installed on an information processing apparatus. For example, an image forming apparatus, such as a printer, a scanner, a facsimile, a copier, and a multi-function peripheral (MFP) of these, can be used as the information processing apparatus. In addition, an electronic device, such as a personal computer and a mobile terminal, can also be used as the information processing apparatus.

Description of the Related Art

A structure of extending a function of an image processing apparatus (information processing apparatus), such as an MFP, by installing an application on the image processing apparatus has been known. Japanese Patent Application Laid-Open No. 2016-24701 discusses a technique of managing applications installed on an information processing apparatus, using application IDs. Japanese Patent Application Laid-Open No. 2016-24701 also discusses a technique of managing an install state of an application using license information.

Customers of information processing apparatuses have diversified needs. It is therefore desirable to provide functions suitable for needs of customers in the form of applications. It is also desirable to enable the personnel concerned, such as servicemen and sales representatives, to provide customized applications to customers in such a manner as to promptly satisfy the demands of the customers.

SUMMARY

In view of the foregoing, a structure for providing an application (custom application) that is customized by combining a general-purpose reproduction application and description information serving as easily-editable descriptive data is disclosed. In the case of providing a custom application, providing a plurality of custom applications in combination in accordance with a client request can result in providing a service with a high client satisfaction level. Nevertheless, in the case of providing a plurality of custom applications to one client, handling of management information, such as a license number (license code) and an activation code (install code), may become complicated.

The present disclosure is directed to providing an information processing system that can provide one license code corresponding to a combination of a plurality of custom applications.

According to an aspect of the present disclosure, an information processing system that provides an application to be executed on an image processing apparatus, the information processing system includes one or more controllers configured to provide, as a first combination application, combination information regarding a reproduction application that reproduces a description file defining an operation procedure, and a first description file, provide, as a second combination application, combination information regarding the reproduction application and a second description file, and output a license code associated with the first combination application and the second combination application.

Further features of the present disclosure will become apparent from the following description of exemplary embodiments with reference to the attached drawings.

BRIEF DESCRIPTION OF THE DRAWINGS

FIG. 3A is a diagram illustrating a hardware configuration of a multifunction peripheral (MFP).

FIG. 8 is a sequence diagram illustrating processing that is executed between software modules of the description editor.

FIG. 11 is a diagram including diagrams of FIGS. 11A and 11B illustrating a description.

FIG. 16 is a diagram illustrating an example of an install code management table.

FIG. 20 is a diagram illustrating a procedure of checking a function of a device at the time of installer package creation.

DESCRIPTION OF THE EMBODIMENTS

Exemplary embodiments of the present disclosure will be specifically described below with reference to the drawings. The scope of the present disclosure is not limited to the configurations described in the exemplary embodiments. Within the scope in which a similar effect is obtainable, modifications may be made by omitting or replacing a part of configurations or a part of processing with equivalents.

<Authoring System>

Figure 1:
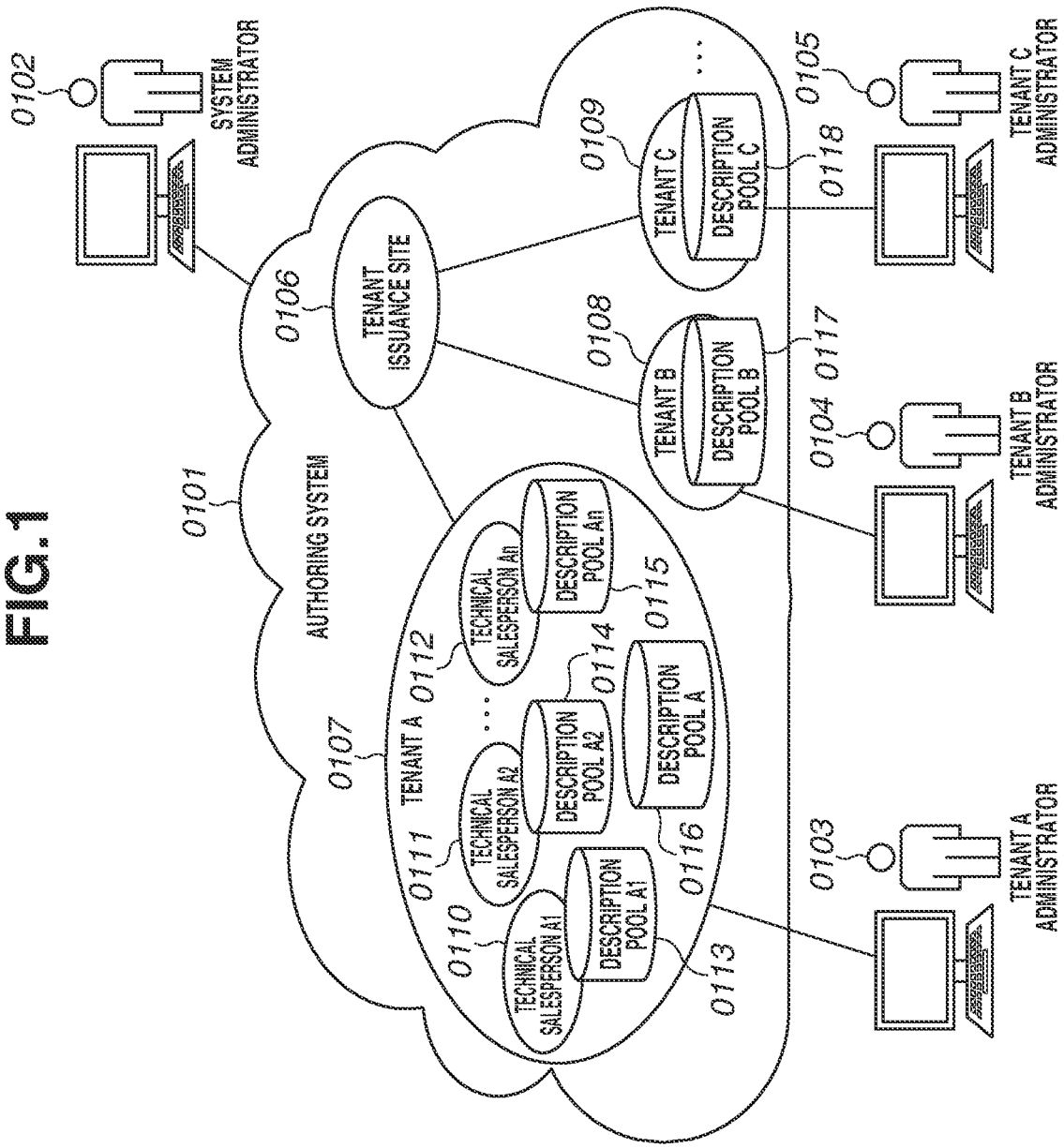
FIG. 1 is a diagram illustrating an authoring system.
Figure 2A:
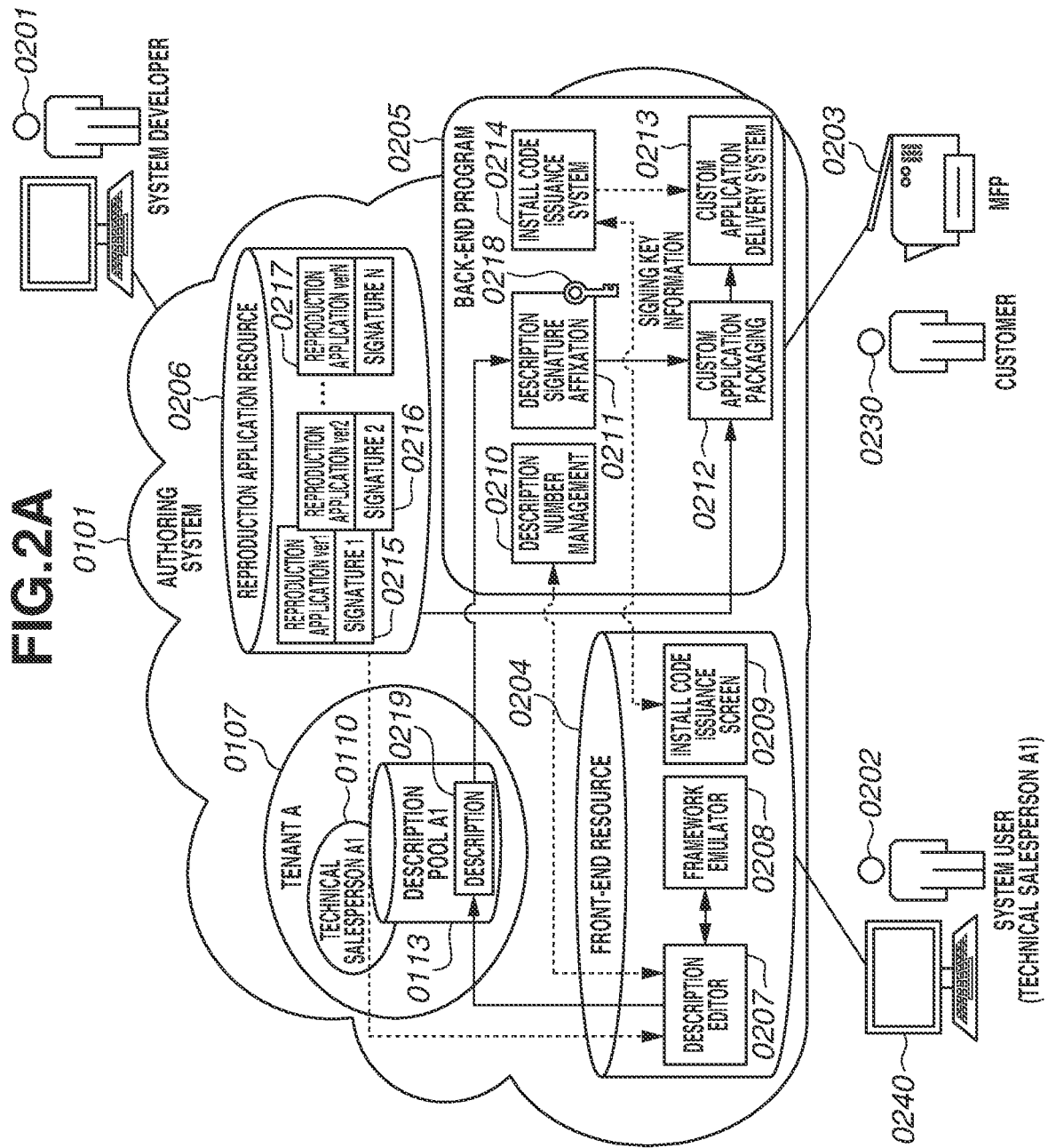
FIG. 2A is a diagram illustrating a software configuration of the authoring system.

FIG. 1 is a diagram illustrating an authoring system. An authoring system 0101 is an information processing system that provides an editing environment of a custom application to be executed by a multifunction peripheral (MFP) 0203 (FIG. 2A). In the present exemplary embodiment, the use of the authoring system 0101 enables the personnel concerned, such as servicemen and sales representatives, to customize an application. With the above-described configuration, it becomes possible to promptly provide custom applications suitable for the demands of customers. It is also possible to appropriately manage increasing types of custom applications provided to satisfy the demands of customers.

The authoring system 0101 is a system constructed on a general-purpose cloud service, and is accessible from various apparatuses via a network. Logging in of all administrators and users who use the authoring system 0101 is managed by a user authentication structure. More specifically, administrators and users perform a user authentication procedure using user IDs and passwords when starting to use the authoring system 0101. In the present exemplary embodiment, a function provided by a general-purpose cloud service is used as the user authentication structure, and the detailed description thereof will be omitted. Alternatively, the authoring system 0101 can include a unique user authentication function.

The authoring system 0101 includes a tenant issuance site 0106, and can create a plurality of tenants in accordance with the intended use. FIG. 1 illustrates a state in which at least a tenant A (0107), a tenant B (0108), and a tenant C (0109) have been issued. For example, by accessing the tenant issuance site 0106 via a web browser from a client terminal 0240 (FIG. 2A), a system administrator 0102 can create tenants for group sales companies in various countries. The system administrator 0102 can also issue tenants not for a group sales company but for a system integrator.

In a case where tenants are issued, one or more administrators are allocated to each of the tenants for managing the corresponding tenant. FIG. 1 illustrates an example in which at least a tenant A administrator 0103 who manages the tenant A (0107), a tenant B administrator 0104 who manages the tenant B (0108), and a tenant C administrator 0105 who manages the tenant C (0109) exist. A tenant administrator of a certain tenant can set or delete another tenant administrator.

A tenant administrator can access a tenant to be managed, via a web browser from the client terminal 0240, and create a plurality of user accounts of users who use the tenant. FIG. 1 illustrates an example in which the tenant A administrator 0103 has created accounts of technical salespersons from a technical salesperson A1 (0110) and a technical salesperson A2 (0111) to a technical salesperson An (0112). Description pools for storing descriptions are allocated to the respective accounts. The descriptions are files (description files) describing behaviors (operation procedures) of custom applications, and can be created using the authoring system 0101. The configuration of the custom application and the details of the descriptions will be described below.

FIG. 1 illustrates a state in which the description pools are allocated to the respective accounts of the technical salespersons from the technical salesperson A1 (0110) and the technical salesperson A2 (0111) to the technical salesperson An (0112). The description pools from a description pool A1 (0113) and a description pool A2 (0114) to a description pool An (0115) (n is a natural number) are allocated to the respective accounts. Similarly, the tenant B administrator 0104 and the tenant C administrator 0105 can appropriately create user accounts in their respective tenants, which is not illustrated in FIG. 1. In addition, by providing a shared description pool in a tenant, a tenant administrator can permit a plurality of accounts in the tenant to share one description. FIG. 1 illustrates an example in which a description is shared in the tenant A (0107) by providing a shared description pool A (0116) in the tenant A (0107). As a similar configuration of sharing a description in a tenant, a shared description pool B (0117) and a shared description pool C (0118) are provided in the tenant B (0108) and the tenant C (0109), respectively.

In the present exemplary embodiment, a shared description pool is set in such a manner that all accounts in a tenant are permitted to read and write the description. The setting of the shared description pool can be changed in such a manner that writing and reading are restricted based on the account. The authoring system 0101 can also include a shared description pool accessible from accounts of all tenants. The shared description pool can also be set in such a manner that restrictions are imposed based on the account.

<Usage Flow of System>

Figure 9:
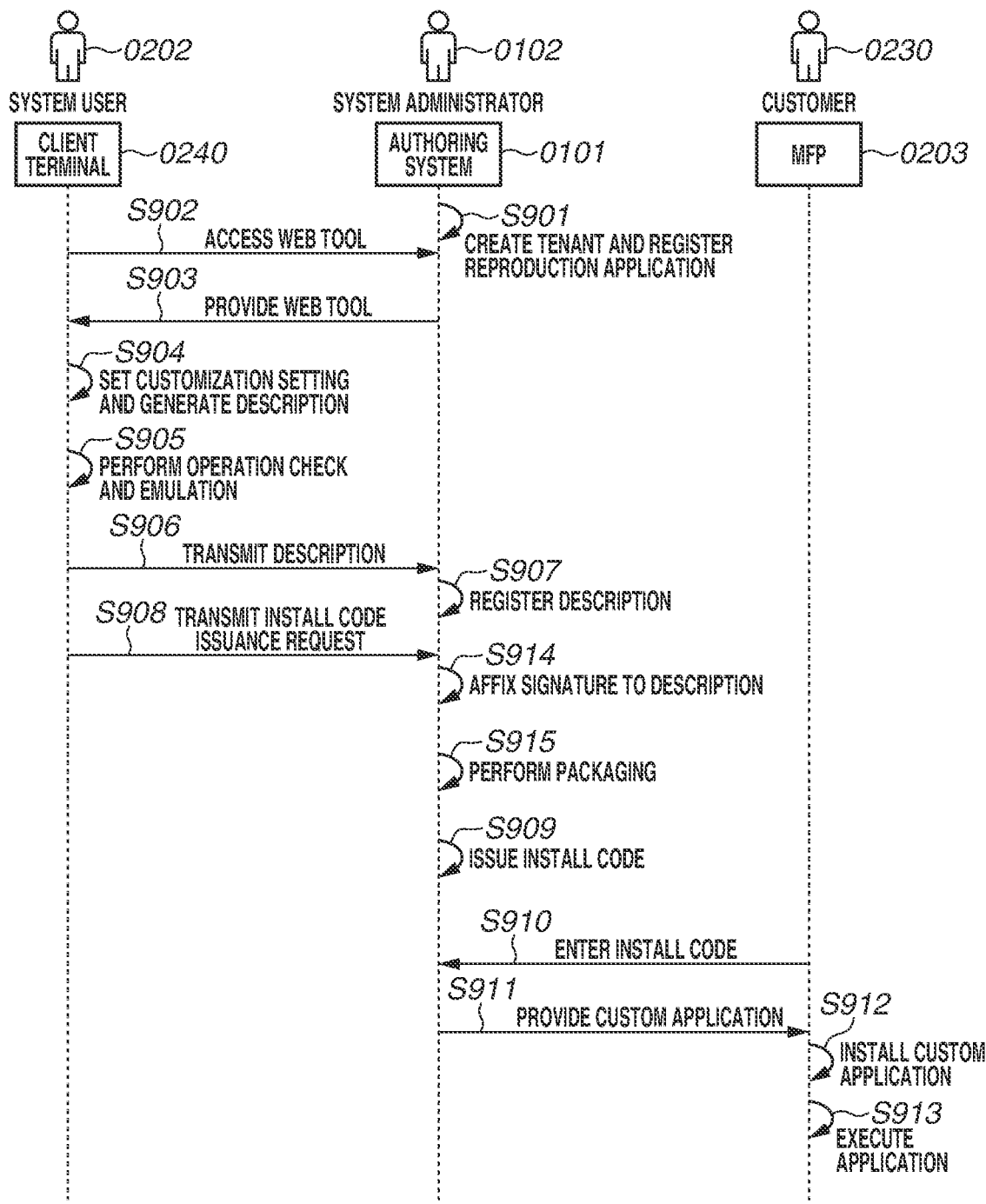
FIG. 9 is a diagram illustrating a usage procedure of the authoring system.

A main usage procedure of the authoring system 0101 will be described with reference to FIG. 9. FIG. 9 is a diagram illustrating a usage procedure of the authoring system 0101.

In step S901, the system administrator 0102 performs tenant creation processing and reproduction application registration processing on the authoring system 0101. Aside from information regarding a reproduction application for a custom application, information regarding a normal application is registered in the authoring system 0101. These applications are managed in a manner distinguishable from other applications, based on uniquely identifiable information. In step S902, a system user 0202 accesses a web tool based on tenant information using the client terminal 0240. In step S903, the client terminal 0240 acquires a web tool from the authoring system 0101 via a network.

In steps S904 to S907, in accordance with an instruction issued by the system user 0202, the client terminal 0240 performs description generation processing and description registration processing using the web tool. The description registered in the authoring system 0101 is managed in a manner distinguishable from other descriptions, based on uniquely identifiable information.

In step S908, the client terminal 0240 transmits an install code issuance request of a custom application that uses the registered description, to the authoring system 0101.

In step S914, the authoring system 0101 that has received the install code issuance request affixes signature information to a description 0219 by using signing key information 0218 in description signature affixation 0211 to be described below with reference to FIG. 2A. The signing key information 0218 is information different from key information that is used for affixing a signature to a reproduction application, which will be described below. The key information that is used for affixing a signature to a reproduction application is managed in a development environment of a system developer 0201 (FIG. 2A).

In step S915, the authoring system 0101 performs packaging processing of a signed description and a signed reproduction application in custom application packaging 0212 to be described below with reference to FIG. 2A.

In step S909, the authoring system 0101 issues an install code in an install code issuance system 0214, and registers the packaged custom application into a custom application delivery system 0213. The issued install code is conveyed from the system user 0202 to a customer 0230 by a communication tool, such as a telephone or an e-mail.

In step S910, in response to the customer 0230 entering the install code into the MFP 0203, the MFP 0203 transmits the install code to the authoring system 0101.

In step S911, the authoring system 0101 provides a custom application corresponding to the received install code, to the MFP 0203 in the custom application delivery system 0213. In the present exemplary embodiment, the code entered in the procedure is described as an install code, but a name such as a license number, a license code, a license key, or an activation code can be used as long as the code is information to be entered for delivering or installing of a custom application.

In step S912, the MFP 0203 that has received the custom application installs the received custom application. When the install is normally completed, in step S913, the custom application is executed, and a function provided by the custom application becomes ready to be used by the customer 0230.

<Software Configuration of Authoring System>

Next, a software configuration of the authoring system 0101 will be described. FIG. 2A is a diagram illustrating a software configuration of the authoring system 0101.

In FIG. 2A, the authoring system 0101, the tenant A (0107), the technical salesperson A1 (0110) which is a user account, and the description pool A1 (0113) are the same as those illustrated in FIG. 1.

The authoring system 0101 includes software modules such as a front-end resource 0204, a back-end program 0205, and a reproduction application resource 0206.

The front-end resource 0204 stores resources, such as a description editor 0207, a framework emulator 0208, and an install code issuance screen 0209. Each of the resources operates on a web browser that is used when a user accesses the authoring system 0101, by a program described in the JavaScript.

The description editor 0207 is a program (editing program) operating on a web browser when a user of each tenant creates and edits a description. Descriptions created by the description editor 0207 can be stored into a description pool associated with a user account. FIG. 2A illustrates an example in which the technical salesperson A1 (0110) serving as the system user 0202 logs into the authoring system 0101 and accesses the front-end resource 0204. FIG. 2A also illustrates a state in which the description 0219 created by the technical salesperson A1 (0110) serving as the system user 0202, using the description editor 0207 stored in the front-end resource 0204, is stored in the description pool A1 (0113). As described above, the description pool A1 (0113) is associated with the technical salesperson A1 (0110) which is a user account created in the tenant A (0107).

The framework emulator 0208 is a program that is invoked for checking of a behavior of a description being created (being edited) or having been created on the description editor 0207, in the description editor 0207. The framework emulator 0208 is configured to operate on a web browser. The framework emulator 0208 emulates an operation of an application framework in a device, and visualizes a behavior of a custom application including a created description, by outputting the behavior as screen information.

The install code issuance screen 0209 is a program for displaying an install code, which is to be used for installing a custom application on a device, on a web browser that is used by the user.

The back-end program 0205 stores description number management 0210, the description signature affixation 0211, the custom application packaging 0212, the custom application delivery system 0213, and the install code issuance system 0214.

Each program stored in the back-end program 0205 is executed by a server apparatus 0220 existing on a cloud hosting the authoring system 0101, and operates in cooperation with each program of the front-end resource 0204.

The description number management 0210 is a program for issuing a unique serial number for identifying an individual description. The description number management 0210 is invoked when the user starts to create a new description using the description editor 0207. The description number management 0210 is also invoked when the user deletes a description created in the past. The description number management 0210 also has a function of performing processing of returning a serial number, which is allocated to a description desired to be deleted when the description is created, to a reusable state if the description is not used as a custom application.

The description signature affixation 0211 is a program for affixing a signature to assure that a description has not been falsified, to the description. The signature affixation is performed when the install package of a custom application including the created description is generated, for example. The description signature affixation 0211 includes the signing key information 0218 to be used when the signature is affixed. FIG. 2A illustrates an example in which the description signature affixation 0211 affixes a signature to the description 0219 stored in the description pool A1 (0113).

The custom application packaging 0212 is a program for performing install packaging of a custom application. In the install package, a signed description generated by the description signature affixation 0211 and a specific reproduction application to be described below are consolidated into one package. By performing install packaging, a custom application becomes installable on a certain device. The detailed structure of the install package will be described below.

The custom application delivery system 0213 is a program of a system that delivers, to devices, an install package of one or more custom applications that has been preliminarily associated with an install code issued by the install code issuance screen 0209. The install package of one or more custom applications will be hereinafter referred to as an install package archive of custom applications. In response to receipt of a delivery request including an install code, from a device, the custom application delivery system 0213 transmits an install package archive of the one or more custom applications that has been associated with the install code, to the device. FIG. 2A illustrates an example in which the MFP 0203 serving as a device is connected to the back-end program 0205 of the authoring system 0101, and install packages of custom applications are sequentially transmitted to the MFP 0203.

The install code issuance system 0214 is a program that operates in cooperation with the install code issuance screen 0209, and issues an install code corresponding to one or more custom applications selected by the user. The install code issuance system 0214 also internally holds a table indicating a relationship between the selected one or more custom applications (i.e., install package archive of custom applications) and the issued install code. The details will be described below.

The install package archive of custom applications can be generated on demand, or can be preliminarily generated.

In a case where an install package archive of custom applications is generated on demand, the custom application packaging 0212 generates the install package archive after the custom application delivery system 0213 receives, from a device, a delivery request including an install code. On the other hand, in a case where an install package archive of custom applications is preliminarily generated, the custom application packaging 0212 generates the install package archive when the install code issuance system 0214 issues an install code. Then, the generated install package archive is held inside the install code issuance system 0214 together with the table indicating a relationship with the issued install code.

The reproduction application resource 0206 stores a signed application, which is an application for reproducing a created description, and is a package to which a signature has been preliminarily affixed. The number of reproduction applications managed by the reproduction application resource 0206 is not limited to one. For example, a plurality of reproduction applications can be individually managed based on the respective versions. FIG. 2A illustrates an example in which the reproduction application resource 0206 stores reproduction applications from a reproduction application ver1 (0215) and a reproduction application ver2 (0216) to a reproduction application verN (0217), to which signatures are preliminarily affixed. Corresponding signatures from a "signature 1" and a "signature 2" to a "signature N" are affixed to the respective reproduction applications. Each of the reproduction applications is developed by the system developer 0201. The signatures of the reproduction applications are preliminarily affixed in the development environment of the system developer 0201, in which key information to be used for the signing is strictly managed. Then, a reproduction application to which a signature is preliminarily affixed is timely uploaded by the system developer 0201 to the reproduction application resource 0206. In addition, each reproduction application stored in the reproduction application resource 0206 includes customizable information. When starting the creation of a description using the description editor 0207, the user selects a version of a reproduction application. Then, the description editor 0207 acquires, from a reproduction application of the selected version, customizable information unique to the reproduction application. Due to the above-described configuration, it becomes unnecessary for the description editor 0207 to statically hold information, such as menu items necessary for customization.

<Server Apparatus>

Figure 2B:
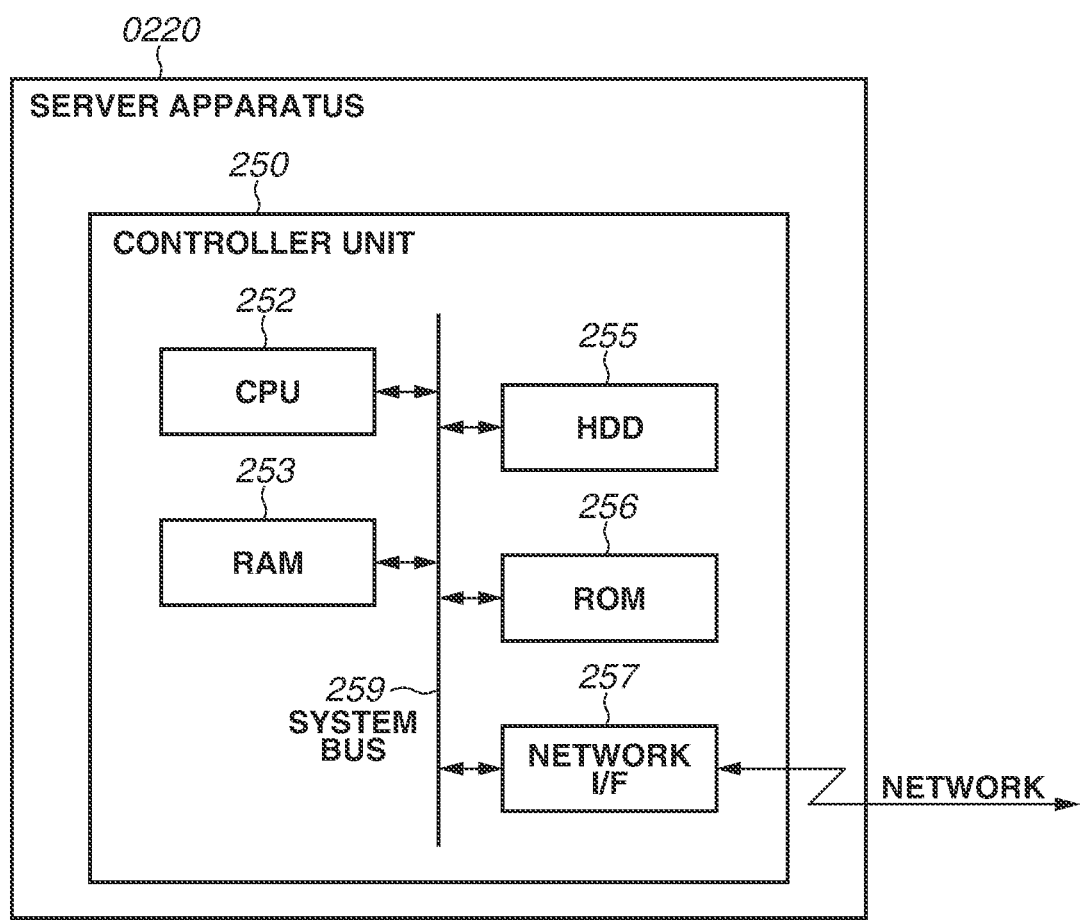
FIG. 2B is a diagram illustrating a hardware configuration of a server apparatus that is used in the authoring system.

A hardware configuration for implementing of the software configuration of the authoring system 0101, which has been described with reference to FIG. 2A, will be described. Because the authoring system 0101 is a system constructed on a cloud, the authoring system 0101 includes a plurality of apparatuses in such a manner that processing load is distributed to the plurality of apparatuses. In the present exemplary embodiment, a case where the authoring system 0101 includes a single apparatus, which is the server apparatus 0220, will be described for ease of explanation. FIG. 2B is a diagram illustrating a hardware configuration of the server apparatus 0220 that is used in the authoring system 0101.

The server apparatus 0220 is an information processing apparatus for implementing the authoring system 0101, and include a controller unit 250. The controller unit 250 includes a central processing unit (CPU) 252, a random access memory (RAM) 253, a hard disk drive (HDD) 255, a read-only memory (ROM) 256, and a network interface (I/F) 257. The CPU 252, the RAM 253, the HDD 255, the ROM 256, and the network I/F 257 are connected via a system bus 259.

The CPU 252 controls operations of the server apparatus 0220, and operates based on programs stored in the RAM 253. The ROM 256 is a boot ROM, and stores a boot program of a system. The network I/F 257 is connected to a local area network (LAN), and controls input-output of various types of information via a network. The HDD 255 stores various programs including system software. A program stored in the HDD 255 is loaded on the RAM 253, and the CPU 252 controls an operation of the server apparatus 0220 based on the program.

Account information of the above-described administrator and the user, and information regarding tenants represented by the tenant A (0107) illustrated in FIG. 2A are all stored and managed on the HDD 255. The front-end resource 0204, the back-end program 0205, and the reproduction application resource 0206 that are illustrated in FIG. 2A are also stored on the HDD 255. In addition, a program for implementing a user authentication structure of administrators and users, which has been described with reference to FIG. 1, is also stored on the HDD 255, which is not illustrated in FIG. 2B. In a case where the server apparatus 0220 is activated, the program for implementing the user authentication structure is automatically loaded on the RAM 253 and executed by the CPU 252. For example, in a case where the system developer 0201 or the system user 0202 (technical salesperson A1 (0110)) illustrated in FIG. 2A accesses the authoring system 0101 to log into the authoring system 0101, the login request is transmitted to a user authentication program via the network I/F 257. Then, the user authentication program displays a login screen on a web browser of a personal computer (PC) used by the system developer 0201 or the system user 0202 (technical salesperson A1 (0110)). The description editor 0207 stored in the front-end resource 0204 is also stored on the HDD 255. For example, in a case where the system user 0202 (technical salesperson A1 (0110)) logs in the authoring system 0101 and accesses a uniform resource locator (URL) of the description editor 0207, the request is transmitted to the server apparatus 0220 via the network IN 257. Then, a program of the description editor 0207 is returned to a web browser of the PC used by the system user 0202 (technical salesperson A1 (0110)), and operates on the web browser. Similar processing is performed as for the framework emulator 0208 and the install code issuance screen 0209.

The description number management 0210 stored in the back-end program 0205 is also stored on the HDD 255. As described above, the back-end program 0205 is driven in cooperation with each program of the front-end resource 0204. In response to a drive request, each of the modules including the description number management 0210 that are stored in the back-end program 0205 is loaded from the HDD 255 on the RAM 253, and executed by the CPU 252.

<MFP>

Figure 3B:
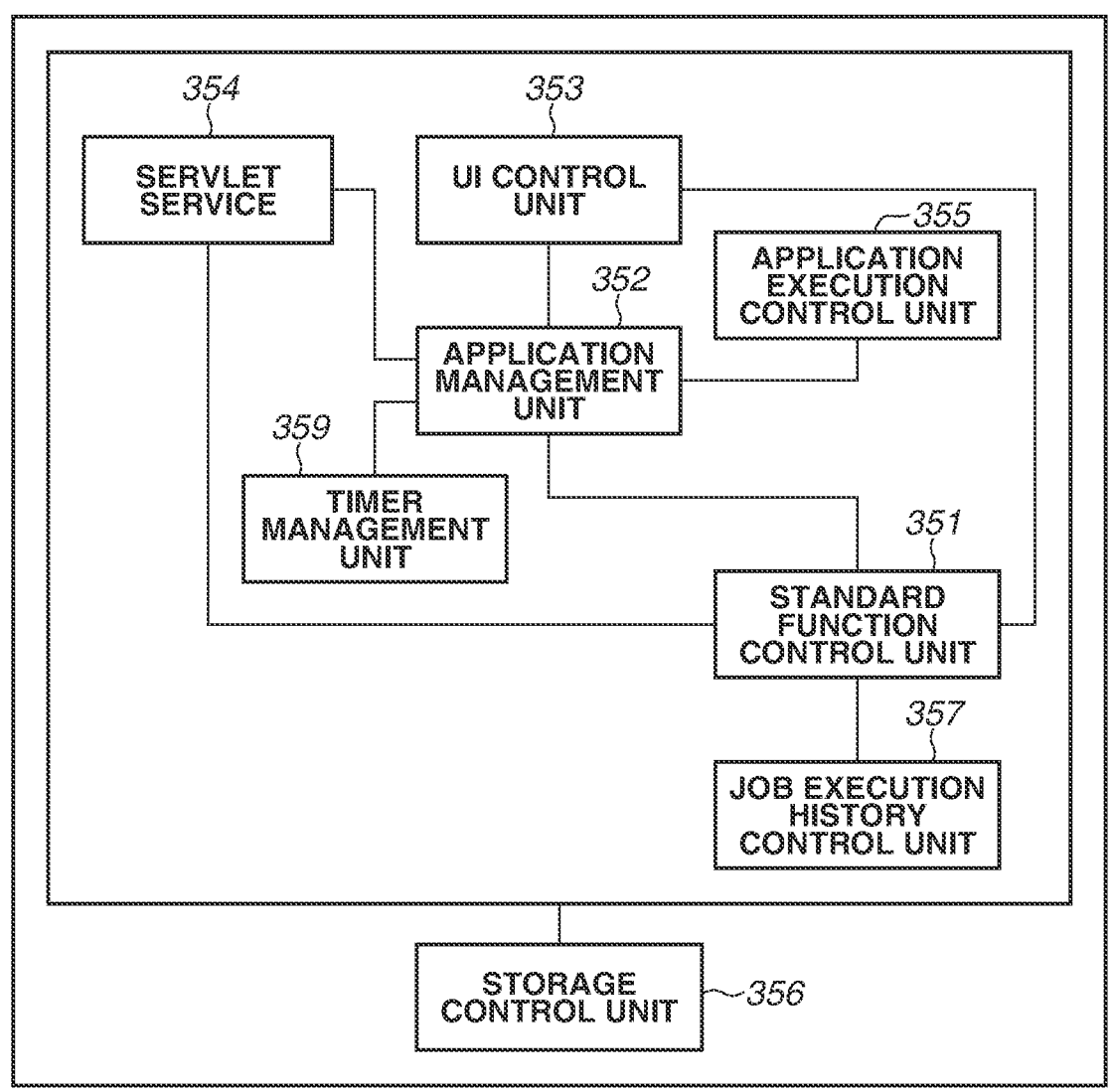
FIG. 3B is a diagram illustrating a software configuration of the MFP.

The MFP 0203 is an information processing apparatus that processes information, is an image processing apparatus that processes images, and is an image forming apparatus that forms images on sheets. FIG. 3A is a diagram illustrating a hardware configuration of the MFP 0203. FIG. 3B is a diagram illustrating a software configuration of the MFP 0203.

The MFP 0203 includes a controller unit 300, a printer 395, a scanner 370, an operation unit 312, and a universal serial bus (USB) storage 314. The controller unit 300 performs control to execute a copy function of printing and outputting image data read by the scanner 370, using the printer 395. The scanner 370 is an image reading unit that reads an image from a document. The printer 395 is an image forming unit that forms an image on a sheet (paper). The operation unit 312 is a reception unit that receives an instruction from a user, and is a display unit that displays information to the user.

The controller unit 300 includes a CPU 301, and the CPU 301 starts up an operating system (OS) by a boot program stored in a ROM 303.

On the OS, the CPU 301 executes programs stored in a storage 304, to execute various types of processing. A RAM 302 is used as a work area of the CPU 301. The RAM 302 provides a work area, and also provides an image memory region for temporarily storing of image data. The storage 304 stores programs and image data.

Via a system bus 307, the ROM 303, the RAM 302, an operation unit I/F 306, a network I/F 310, a USB host I/F 313, and an image bus I/F 305 are connected to the CPU 301. The operation unit I/F 306 is an interface to the operation unit 312 including a touch panel, and outputs image data to be displayed on the operation unit 312, to the operation unit 312. The operation unit I/F 306 transmits information input by the user via the operation unit 312, to the CPU 301. The network I/F 310 is an interface for connection of the MFP 0203 to a LAN. The USB host I/F 313 serves as an interface unit for communicating with the USB storage 314. The USB host I/F 313 also serves as an output unit for storing data stored in the storage 304, into the USB storage 314. The USB host I/F 313 also inputs data stored in the USB storage 314, and conveys the data to the CPU 301. The USB storage 314 is an external storage device storing data, and is detachably attached to the USB host I/F 313. A plurality of USB devices including the USB storage 314 can be connected to the USB host I/F 313. A real-time clock (RTC) 315 controls the current time. Time information controlled by the RTC 315 is used for recording a job input time. The image bus I/F 305 is a bus bridge for connection between the system bus 307 and an image bus 308 that transfers image data at high speed, and converting a data format. The image bus 308 includes a peripheral component interconnect (PCI) bus or a bus complying with the Institute of Electrical and Electronics Engineers (IEEE) 1394. A device I/F 320, a scanner image processing unit 380, and a printer image processing unit 390 are provided on the image bus 308. The scanner 370 and the printer 395 are connected to the device I/F 320, and the device I/F 320 performs synchronous/asynchronous conversion of image data. The scanner image processing unit 380 performs correction, processing, or editing on input image data. The printer image processing unit 390 performs correction or resolution conversion that is suitable for the printer 395, on print output image data.

By the CPU 301 loading a program stored in the storage 304, on the RAM 302, and executing the program, each module illustrated in FIG. 3B is implemented. FIG. 3B is a diagram illustrating a software configuration of the MFP 0203.

The MFP 0203 includes, as software configurations, a servlet service 354, a user interface (UI) control unit 353, an application management unit 352, a storage control unit 356, an application execution control unit 355, a standard function control unit 351, and a timer management unit 359.

The servlet service 354 is a module that receives a HyperText Transfer Protocol (HTTP) access request when the access request is transmitted via the network I/F 310, and then assigns processing to a module (the application management unit 352 or the standard function control unit 351) depending on the accessed URL.

The UI control unit 353 is a module that displays a screen on the operation unit 312, receives an operation from the user, and notifies an appropriate module (the application management unit 352 or the standard function control unit 351) of information on the operation. The application management unit 352 is a module that manages install and activation of an extension application 440 (FIG. 4) which has been installed.

The application execution control unit 355 is a module that performs execution control of an application activated by the application management unit 352. Specifically, the application execution control unit 355 controls a virtual machine (VM) thread 415, a VM system service 420, a VM 430, and the extension application 440.

The storage control unit 356 is a module that records and manages programs and setting information of the extension application 440.

The application execution control unit 355 accesses the storage control unit 356 and reads out programs of applications. In addition, each module accesses the storage control unit 356, and refers to and sets a setting value.

The standard function control unit 351 is a module that controls copy and facsimile, which are standard functions of the MFP 0203, and performs other types of control necessary for the MFP 0203 (e.g., control of the USB host I/F 313). The standard function control unit 351 also manages executed copy or facsimile as a job, and requests a job execution history control unit 357 to record an execution result of the job. The job execution history control unit 357 requests the storage control unit 356 to record a history, to store the execution result of the job in a storage as a history.

The timer management unit 359 acquires current time information from the RTC 315, detects a lapse of a predetermined time, and notifies the application management unit 352 of the lapse. In response to the notification from the timer management unit 359, the application management unit 352 requests the application execution control unit 355 to execute timer processing of an application.

Figure 4:
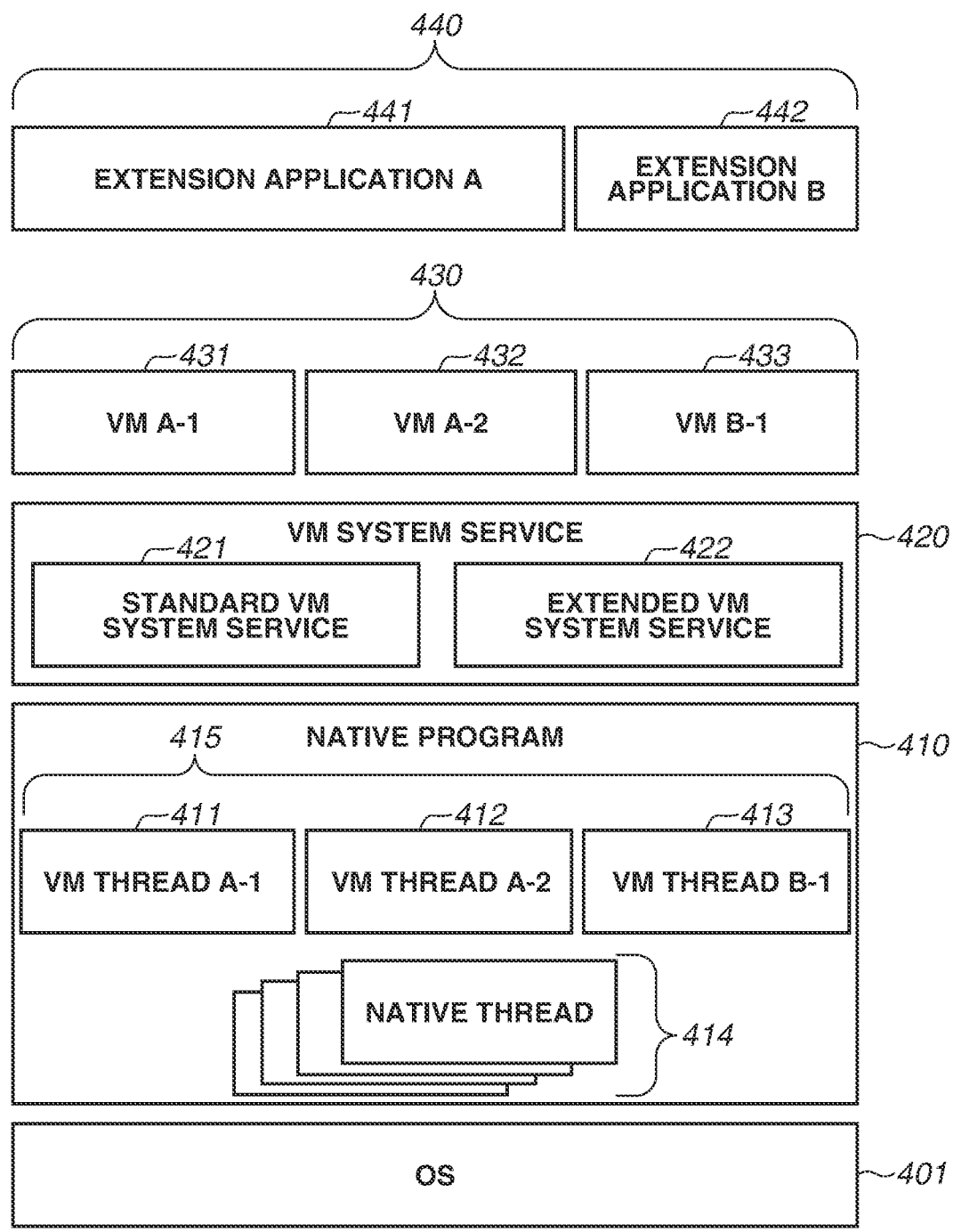
FIG. 4 is a diagram illustrating a software hierarchical structure of the MFP.

The relationship between an OS, a VM, and an application will be described in detail. FIG. 4 is a diagram illustrating a software hierarchical structure of the MFP 0203.

A native program 410 for controlling an image processing unit, such as a printer, a facsimile, and a scanner, operates on an OS 401. The VM 430 serving as an execution environment of the extension application 440 also operates on the OS 401. The VM 430 is a module that interprets and executes a program for controlling the extension application 440. The extension application 440 always operates on the VM 430. Unlike a command operating on the CPU 301, a program operating on the VM 430 operates in response to a command dedicated to the VM 430. The command dedicated to the VM 430 is called a byte code. On the other hand, a command dedicated to a CPU is called a native code. By a VM sequentially interpreting and processing the byte code, a native code operates on the CPU 301 and a byte code of the VM operates. Types of VMs are classified into a type of sequentially interpreting and processing a byte code as-is, and a type of converting a byte code into a native code and executing the converted code. The VM 430 of the present exemplary embodiment is of the former type, but can be the latter type.

If the types of CPUs are different, commands operating on the CPUs are generally incompatible. Similarly, if VMs are different, commands operating on the VMs are incompatible as well. In the present exemplary embodiment, an extension application is described in the Lua language, but can be described in another language. The Lua language converts a script described in the Lua language, into a byte code dedicated to the Lua language, and executes the byte code on the VM 430 dedicated to the Lua language. As a matter of course, a byte code for the Lua language is different from a command code directly-executable by the CPU 301. Thus, the byte code for the Lua language cannot be directly executed by the CPU 301. The VM 430 for the Lua language includes a command code of the CPU 301 as a software module that sequentially interprets and executes a byte code for the Lua language. As a matter of course, the VM 430 can be formed as dedicated hardware that interprets and executes a byte code for the Lua language.

The native program 410 includes native threads 414 for controlling an image processing unit, such as a printer, a facsimile, and a scanner, and VM threads 415 for running the VM 430. The same number of VM threads as the number of VMs 430 exist. In the present exemplary embodiment, three threads corresponding to a VM thread A-1 (411), a VM thread A-2 (412), and a VM thread B-1 (413) are generated.

The VM system service 420 is a utility library that is used in common by the extension applications 440. By invoking a function of the VM system service 420 from the extension application 440, the development speed of the extension application 440 can be increased. In addition, the VM system service 420 can access each module of the MFP 0203. The VM system service 420 includes a standard VM system service 421 to be operated as a VM at the very least, and an extended VM system service 422 that provides each module of the MFP 0203 with an access and a function of an OS. The standard VM system service 421 also includes a function of loading the extension application 440. By the VM 430 executing an application program interface (API) designated by a byte code in the extension application 440, the VM system service 420 associated with the API is invoked. A drawing API for performing a drawing on the screen of the operation unit 312, and a job control API for issuing an execution request of a certain job, such as copy or scan, of the MFP 0203 are provided to the extended VM system service 422.

The VM 430 executes the extension application 440. The VM 430 is generated for each thread of the extension application 440. In FIG. 4, a VM A-1 (431) and a VM A-2 (432) for running two threads by an extension application A (441) are generated. In FIG. 4, a VM B-1 (433) for running one thread by an extension application B (442) is also generated.

On a main menu screen that is displayed on the operation unit 312 of the MFP 0203, an icon of each of the extension applications 440 is displayed. In a case where the operation unit I/F 306 detects, via the operation unit 312, that the user has selected the icon, the operation unit I/F 306 transmits a detection notification to the CPU 301. The CPU 301 that has received the detection notification activates the extension application 440 selected by the user.

In the following description, the structure (the VM system service 420, the VM 430) of running the extension application 440 on the MFP 0203 will be described as an application framework.

<Client Terminal>

Figure 5A:
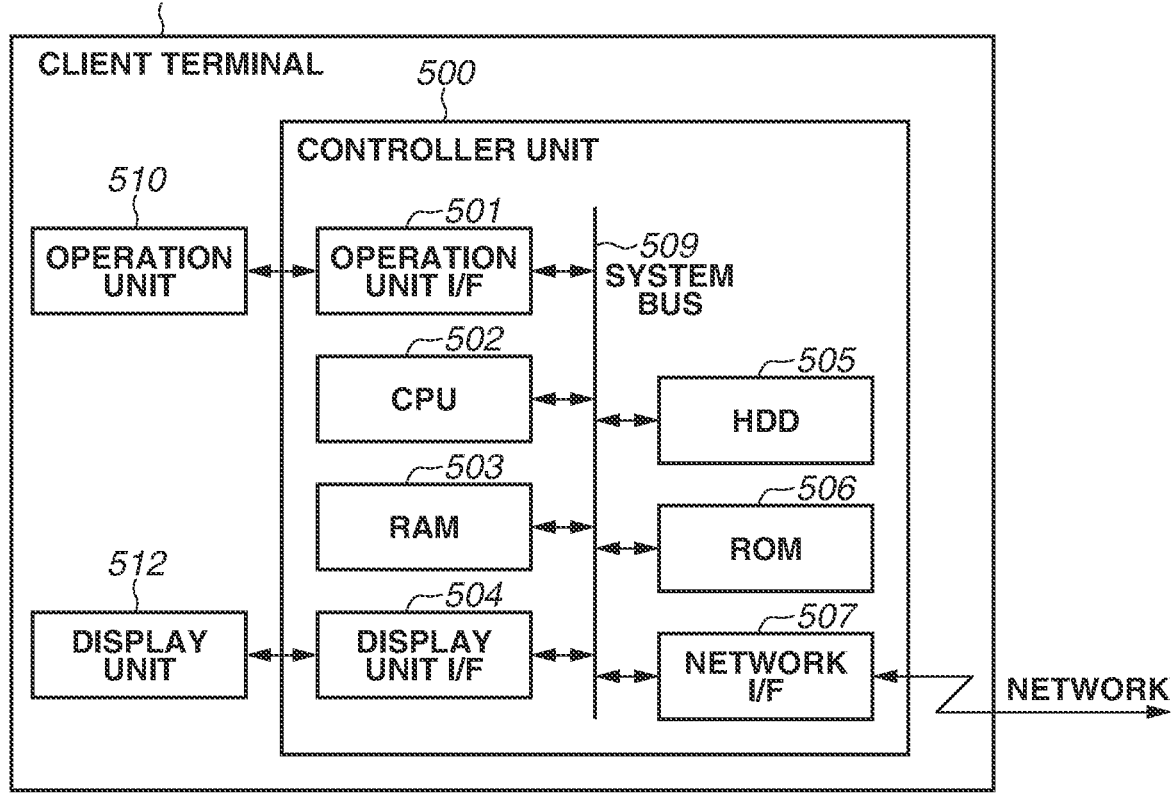
FIG. 5A is a diagram illustrating a hardware configuration of a client terminal.

As a representative of general client terminals included in the system according to the present exemplary embodiment, the client terminal 0240 that is used by the system user 0202 will be described. The configuration to be described below can be applied to a client terminal that is used by the system administrator 0102, the tenant A administrator 0103, the tenant B administrator 0104, the tenant C administrator 0105, or the system developer 0201. FIG. 5A is a diagram illustrating a hardware configuration of the client terminal 0240.

The client terminal 0240 is an external terminal accessing the authoring system 0101. The client terminal 0240 includes a controller unit 500, an operation unit 510, and a display unit 512. The controller unit 500 is connected with hardware components via a system bus 509, and exchanges information with the hardware components. The controller unit 500 loads a program functioning as an OS or a web browser that is recorded on a ROM 506 or an HDD 505, on a RAM 503. The loaded program is sequentially processed by a CPU 502. The operation unit 510 is a reception unit that receives an operation of the user. The operation unit 510 is connected to an operation unit I/F 501, and the CPU 502 is notified of user operation information that is received by the operation unit 510 via the operation unit I/F 501. The operation information is processed by a program operating on the CPU 502. Thus, an operation of the user is processed, and an operation result is displayed on the display unit 512 connected to a display unit I/F 504, or transmitted to a network connected to a network I/F 507.

In the present exemplary embodiment, a web browser is executed on the client terminal 0240, and the authoring system 0101 illustrated in FIG. 1 is accessed via the web browser. The client terminal 0240 can be a general PC, or can be a mobile terminal, such as a smartphone.

Figure 6:
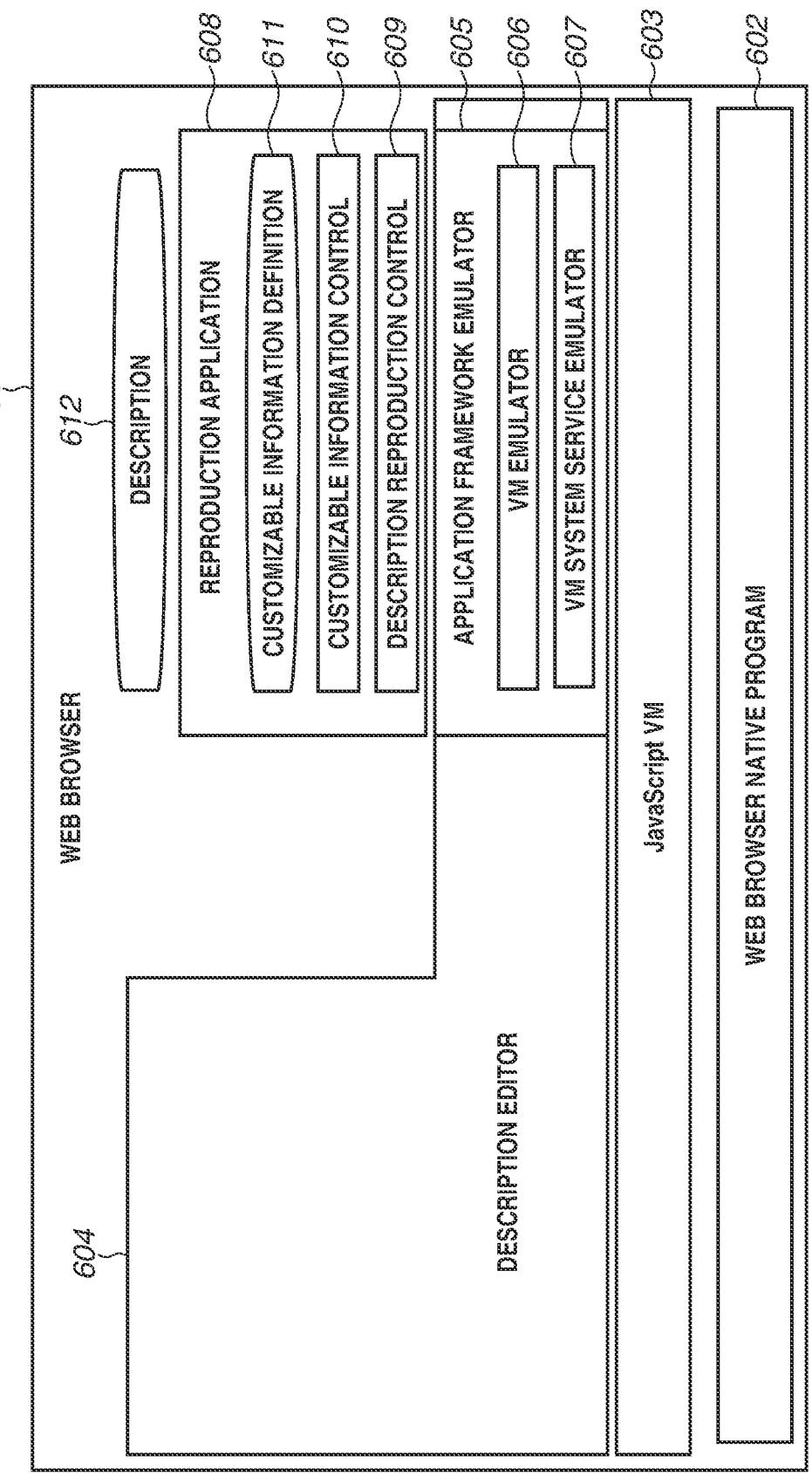
FIG. 6 is a diagram illustrating a software hierarchical structure of the description editor.

Next, a case where the client terminal 0240 executes a description editor on a web browser will be described. FIG. 6 is a block diagram of a web browser displaying a description editor.

A web browser 601 is software for connecting to a web server, and can display a web page and execute a program. The web browser 601 can execute a JavaScript VM 603 on a web browser native program 602, which is a native program for running the web browser itself. The JavaScript VM 603 is a program for running the JavaScript on a web browser.

A description editor 604 is a program described in the JavaScript, and is an example of the description editor 0207 illustrated in FIG. 2A. The description editor 604 is executed on the JavaScript VM 603. The description editor 604 is a program that provides an editing environment of an application.

The description editor 604 also functions as an application framework emulator 605. The application framework emulator 605 executes emulation of an application framework for executing a program in a different language from the JavaScript, on a browser. The application framework emulator 605 is an example of the framework emulator 0208 illustrated in FIG. 2A. In the present exemplary embodiment, the application framework emulator 605 performs emulation of an execution environment of the same language as the language of an application that is executed on the MFP 0203. The application framework emulator 605 includes a VM emulator 606 and a VM system service emulator 607. These emulators emulate operations of the VM 430 and the VM system service 420 illustrated in FIG. 4, on the JavaScript, and are programs described in the JavaScript.

A reproduction application 608 is an application (reproduction program) that operates based on a description customized by the user. The reproduction application 608 is formed similarly to an application that is executed on an application framework of the MFP 0203. FIG. 6 illustrates a configuration in which the reproduction application 608 is executed on the application framework emulator 605. The reproduction application 608 includes customizable information control 610 that performs processing of customizable information inquiry from a VM system service. The reproduction application 608 also includes a customizable information definition 611, and description reproduction control 609 for reproducing a provided description.

A description 612 is data holding customization information edited by the user, in a format reproducible by a reproduction application. In a case where the user designates the details of edit on an edit screen provided by the description editor 604, the description 612 is generated by the description editor 604. The description editor 604 reproduces the generated description 612 using the reproduction application 608 operating on the application framework emulator 605. An operation check screen of a customized application is thus provided to the user on a web browser.

In the present exemplary embodiment, JavaScript is used as a programming language describing the description editor 604, but the description editor 604 can be described in another code directly executable on a web browser, such as WebAssembly, for example.

A reproduction application that is executed by the description editor 604 needs not be completely identical to a reproduction application that is executed on the MFP 0203. For example, an operation check application obtained by extracting only a description reproduction control portion directly related to customization of a reproduction application can be loaded.

Figure 5B:
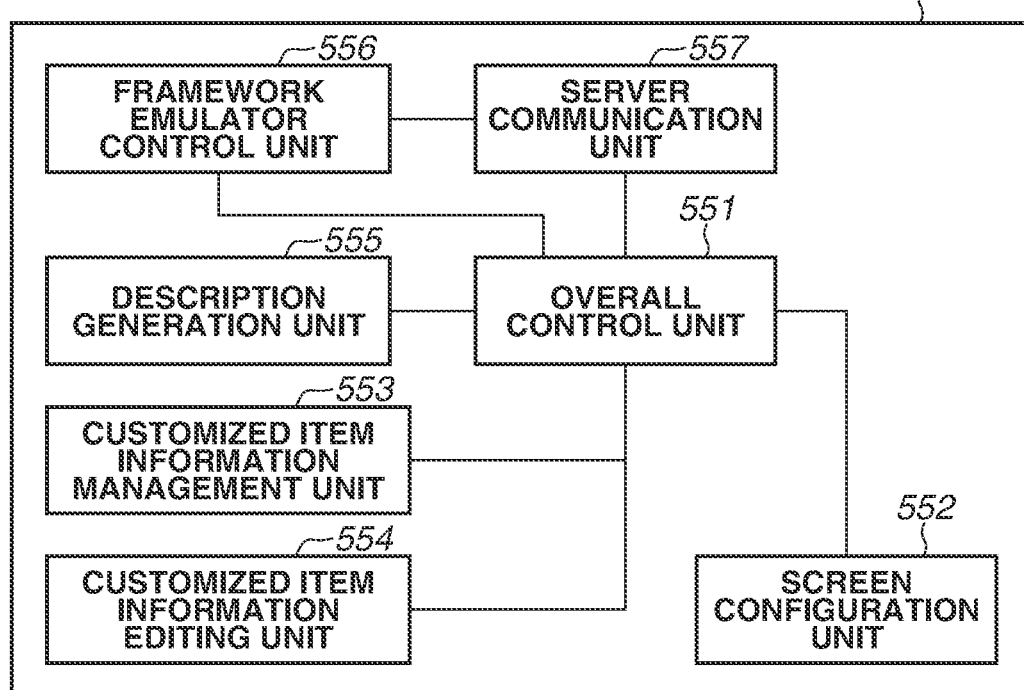
FIG. 5B is a diagram illustrating a software configuration of a description editor that is executed by the client terminal.

Next, the details of the description editor 604 will be described. FIG. 5B is a diagram illustrating a software configuration of the description editor 604 that is executed by the client terminal 0240.

The description editor 604 is a program that is downloaded from a server by a web browser accessing a predetermined URL, and executed on the web browser, and is described in the JavaScript. The description editor 604 includes an overall control unit 551, a screen configuration unit 552, a framework emulator control unit 556, a server communication unit 557, a description generation unit 555, a customized item information management unit 553, and a customized item information editing unit 554.

Figure 7A:
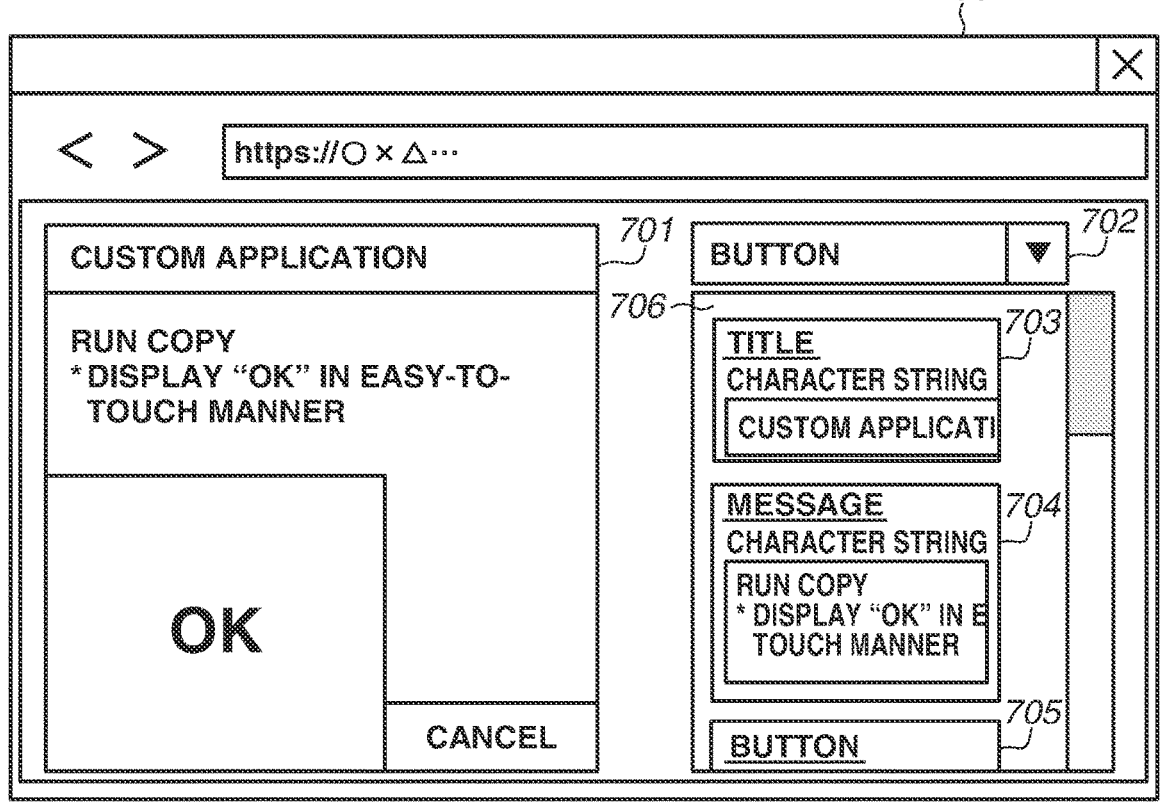
FIG. 7A is a diagram illustrating a screen of the description editor.

The overall control unit 551 is a block that controls entire operation of the description editor 604. By operating in cooperation with each block, the overall control unit 551 controls the description editor 604. The screen configuration unit 552 is a block that controls a screen configuration of the description editor 604. The screen configuration unit 552 updates an HTML element and cascading style sheets (CSS) (screen information) that construct screens illustrated in FIGS. 7A and 7B. The screen configuration unit 552 also receives a user operation and notifies the overall control unit 551 of the user operation (editing operation). In response to the operation notification, the overall control unit 551 appropriately performs control. In a case where the operation notification indicates information regarding an operation performed on a display region 701 in an application screen image, the overall control unit 551 notifies the framework emulator control unit 556 of the operation information. For example, in a case where the user clicks the display region 701 in the application screen image, the framework emulator control unit 556 is notified of information indicating a state that a predetermined point on an application execution screen has been clicked. The framework emulator control unit 556 is a block for executing a reproduction application that reproduces a customized description, on the web. Because the reproduction application is configured to operate on an application framework in the MFP 0203, the reproduction application cannot be directly executed on a web browser. The framework emulator performs emulation to execute an application adapted to the MFP 0203, on the web. The framework emulator control unit 556 receives a screen operation notification from the overall control unit 551, and notifies an application to be executed in the emulator, of the screen operation notification. The application that has received the operation information notification performs screen update corresponding to the operation. The screen update is implemented by a screen drawing API in an application framework. The API is replaced with an image rendering API in a web browser by the framework emulator, and a display screen of the application is displayed in the display region 701 in the application screen image illustrated in FIG. 7A. The customized item information editing unit 554 is a block that acquires customizable item information from a reproduction application, and converts data into a format processable by the description editor 604, based on the acquired customizable item information, and holds the converted data. Based on the customizable item information, the screen configuration unit 552 constructs an item list 702 and a display region 706 of customization setting information. The customized item information management unit 553 is a block that manages currently-set setting information of a customized item. Based on the setting information, the screen configuration unit 552 constructs the display region 706 of customization setting information. The description generation unit 555 is a block that generates a description, based on the current setting information held by the customized item information editing unit 554. The reproduction application is notified of the generated description via the framework emulator control unit 556. Then, The reproduction application reproduces the description, and the display region 701 in the application screen image illustrated in FIG. 7A is updated.

The server communication unit 557 controls communication with a server. The communication with a server includes communication for storing of item setting information held by the customized item information editing unit 554, into the server, and download of a reproduction application that is executed by the framework emulator control unit 556. With the above-described configuration, even in a case where customizable information of a reproduction application increases or decreases or an operation changes, an editing function adapted to the reproduction application can be provided without changing the description editor 604.

<Editing of Description>

First of all, an execution screen of a description editor for creating a custom application will be described. FIG. 7A is a diagram illustrating a screen of the description editor. When the user accesses the authoring system 0101 from a web browser, and starts to customize an application, a screen 700 is displayed on the web browser. The screen 700 is constructed based on an HTML element, the JavaScript, and CSS that have been downloaded from a server. A result obtained by the web browser interpreting these and rendering the screen is displayed. In the present exemplary embodiment, an operation of creating a custom application in which an execution button of Copy is made easily-selectable in response to a demand of a customer will be described as an example. A plurality of items (objects) is arranged on the screen 700, and an editing environment of an application is provided to the user. Major components of the screen 700 will be described next.

The display region 701 is an image display region for displaying of an execution image of an application (application being changed) in which customization designated by the user is reflected. In the present exemplary embodiment, an example in which the image display region is constructed using an HTML canvas element will be described, but the image display region can be constructed using another renderable HTML element. With such a configuration, the user can perform customization while viewing the display region 701 and checking whether desired customization is performed.

The item list 702 is a pull-down format display object displaying a list of customizable (addable) display items. The user can perform customization of adding an item to an application by selecting a desired item from the item list 702 and adding the selected item. Examples of editable items include a button to which a function can be associated, title information, and message information.

Because the added item is instantly reflected in the display region 701, the user can easily check a customization status.

The display region 706 is a customization setting information display region displaying a currently-set item, and information set in the item. In FIG. 7A, a state in which a title item 703, a message item 704, and a button item 705 are set is displayed. By editing information set in the items displayed in the display region 706, the user can customize the items. For example, if a character string "custom application" displayed in the title item 703 is edited to "test application", the edit is reflected in the display region 701, and a region where "custom application" is described is updated to "test application". By editing a parameter of an item, a size or a layout of the item can also be changed.

Next, an execution procedure of the description editor 604 will be described. FIG. 8 is a sequence diagram illustrating processing that is executed between software modules of the description editor 604. Each processing is executed by the controller unit 500. More specifically, each processing is executed by the CPU 502 acquiring a program of the web browser 601 from the ROM 506, loading the program on the RAM 503, and executing the description editor 604 via the JavaScript VM 603.

In the execution procedure of the description editor 604, first of all, in step S800, the overall control unit 551 transmits a screen configuration request to the screen configuration unit 552. The screen configuration unit 552 constructs an edit screen as illustrated in FIG. 7A. In this processing, because customizable item information is undetermined, the item list 702 and the display region 706 of customization setting information are constructed in an empty state. Next, in step S801, the overall control unit 551 transmits a reproduction application download request to the server communication unit 557. In response to the request, the server communication unit 557 downloads a reproduction application from a server. In step S802, the server communication unit 557 transmits the downloaded reproduction application to the overall control unit 551. In step S803, the overall control unit 551 transmits a reproduction application execution request to the framework emulator control unit 556. The framework emulator control unit 556 executes the requested reproduction application. Subsequently, in step S804, the overall control unit 551 transmits a customizable item information acquisition request to the framework emulator control unit 556. In response to the request, the framework emulator control unit 556 transmits a customizable item information acquisition request to the reproduction application, and in step S805, returns acquired customizable item information to the overall control unit 551. In step S806, the overall control unit 551 transmits the acquired customizable item information to the customized item information management unit 553. The customized item information management unit 553 converts data into a data format processable in the description editor, based on the transmitted information. Next, in step S807, the overall control unit 551 transmits a screen update request to the screen configuration unit 552. In this processing, because customizable item information is determined, information is reflected in the item list 702 and the display region 706 of customization setting information, and items enter a user-customizable state. Next, in step S808, the user adds an item from the item list 702. In step S809, in response to the change notification, the screen configuration unit 552 transmits user operation information to the overall control unit 551. In step S810, the overall control unit 551 notifies the customized item information editing unit 554 that a setting value has been changed. In step S811, the customized item information editing unit 554 checks a set value and transmits the current setting value to the overall control unit 551. In step S812, the overall control unit 551 requests the description generation unit 555 to generate a description, based on the current setting value. In step S813, the description generation unit 555 generates a description suitable for the current setting value, and transmits the description to the overall control unit 551. In step S814, the overall control unit 551 transmits the description to the framework emulator control unit 556. The framework emulator control unit 556 reproduces the description using the reproduction application. The display region 701 in the application screen image is thus updated. Lastly, in step S815, the overall control unit 551 transmits a storage request of edited customized item setting information to the server communication unit 557. In response to the request, the server communication unit 557 requests the server to store the customized item setting information. Application customization information set by the user is thus stored into the server. When the user customizes an application next time, the stored information is loaded, and customization can be performed from a state in which information edited by the user is reflected.

Next, a structure of a description will be described. FIG. 11 is a diagram including diagrams of FIGS. 11A and 11B illustrating a description. FIGS. 11A and 11B illustrate an example of a description corresponding to application setting information customized on the screen 700 illustrated in FIG. 7A. More specifically, FIGS. 11A and 11B illustrate a description corresponding to an application that displays a Copy execution confirmation screen and executes a copy job in response to a pressing operation performed on an OK button. In the present exemplary embodiment, the description is described in a JavaScript Object Notation (JSON) format highly-compatible with a web browser. Another format can be used as a format of the description.

The description is broadly divided into panel information 1101 and panel information 1102. The panel information 1101 stores information regarding an item, and customization information of each item. The information regarding an item includes title item information 1103, message item information 1109, OK button item information 1110, and cancel button item information 1111. The customization information of each item includes item ID information 1104, item setting information 1105, item parameter information 1106, an item parameter data type 1107, and item parameter data 1108. The item ID information 1104 is identification information indicating an item of corresponding customization information. In the example case of the present exemplary embodiment, the item ID information 1104 describes that the corresponding customization information is customization information of a "title" item. The item setting information 1105 describes setting information of the item. The item parameter information 1106 describes customization information of a parameter of the item. The item parameter data type 1107 describes the type of data of an item parameter. The item parameter data 1108 describes a setting value of the item parameter. In a case where data_type is "string", information regarding a localized character string is designated.

It can be accordingly seen that the title item information 1103 includes a "title" item and a "title" parameter, and a localized character string "Custom Application" is set as a setting value of the parameter. In the message item information 1109, the OK button item information 1110, and the cancel button item information 1111, customization information is similarly set.

The panel information 1102 stores information for executing a job. In job execution item information 1112, "execute job" is designated as an item for performing job execution. As information 1113 regarding the job execution item information 1112, a job identification ID 1114 describing a job to be executed, and a job parameter 1115 of the job are included as parameter setting values. Because an application in the example case of the present exemplary embodiment executes copy, "copy" is designated in the job identification ID 1114. In the job parameter 1115, a parameter to be used in executing the job can be registered. In the example case of the present exemplary embodiment, number of copies information 1116 and color mode 1117 are registered.

The above exemplified description is read by the description reproduction control 609 of the reproduction application 608, for example. Then, the reproduction application 608 constructs a screen corresponding to the description, and performs screen transition and job execution control in accordance with a user operation.

<Issuance of Install Code>

Figure 12:
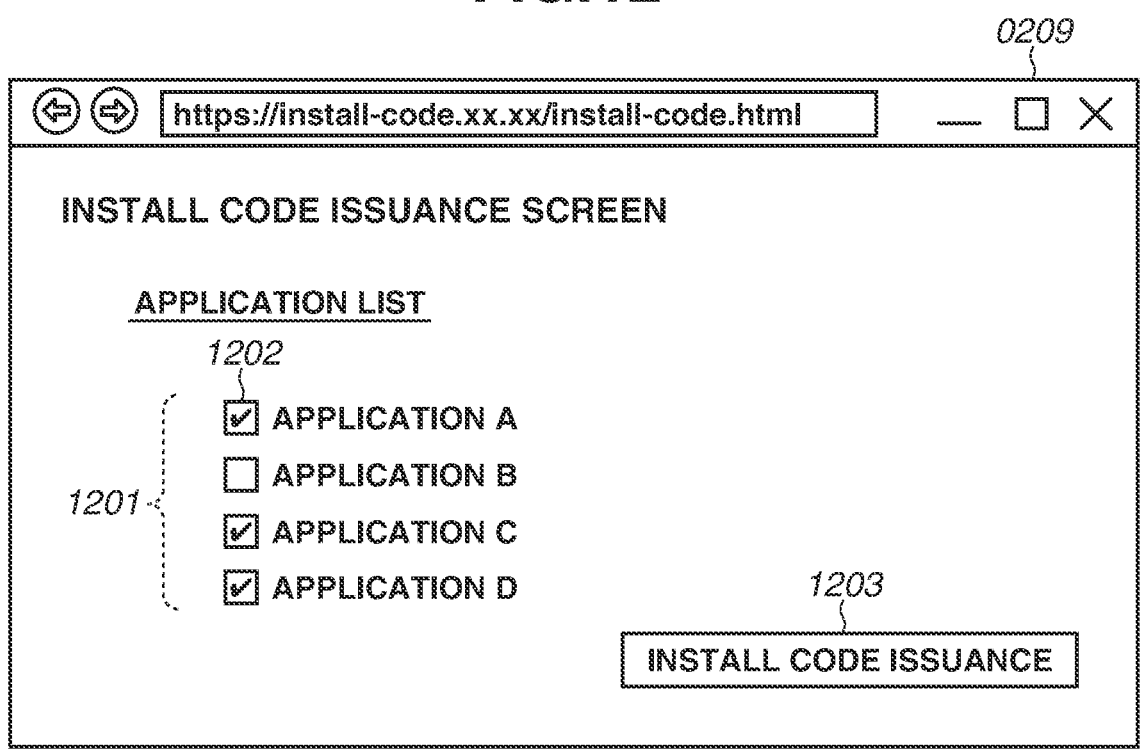
FIG. 12 is a diagram illustrating an example of an install code issuance screen.

The issuance of an install code will be described. FIG. 12 is a diagram illustrating an example of the install code issuance screen 0209.

The install code issuance screen 0209 includes an application list 1201 serving as a list of custom applications selectable by a user, a checkbox 1202 serving as a custom application selection unit, and an install code issuance button 1203.

A system user can search for an application of which an install code is desired to be issued, from the application list 1201, designate the application using the checkbox 1202, and cause the desired install code to be issued by pressing the install code issuance button 1203. In response to the pressing operation performed on the install code issuance button 1203, the install code issuance screen 0209 transmits, to the install code issuance system 0214, an issuance request of an install code associated with selected one or more custom applications.

Figure 13:
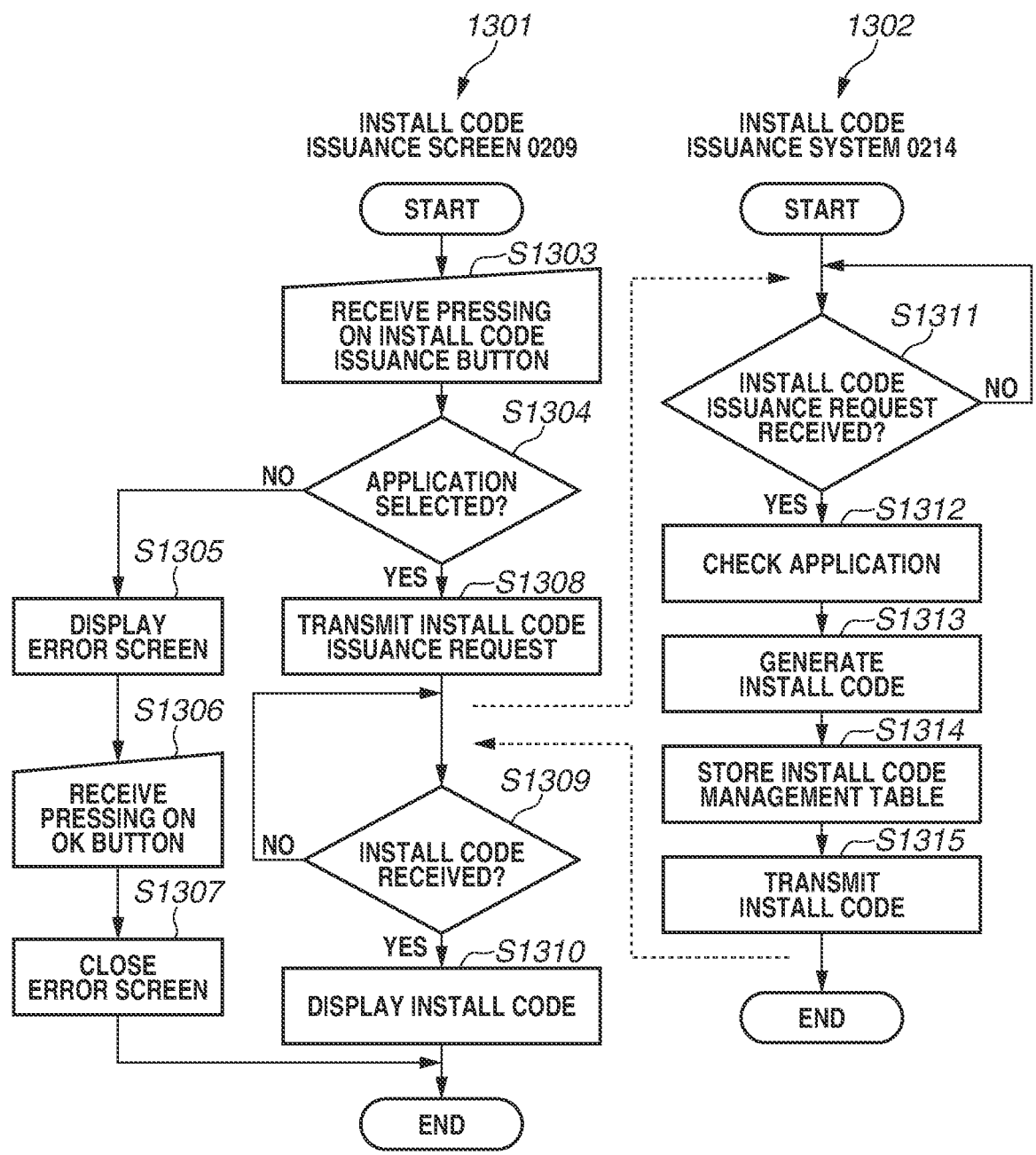
FIG. 13 is a diagram illustrating an install code issuance procedure.

FIG. 13 is a diagram illustrating an install code issuance procedure. In FIG. 13, a procedure 1301 illustrates processing that is performed on the install code issuance screen 0209.

In step S1303, the install code issuance screen 0209 receives a pressing operation performed on the install code issuance button 1203.

In step S1304, the install code issuance screen 0209 determines whether a custom application is selected using the checkbox 1202. In a case where a custom application is not selected (NO in step S1304), the install code issuance screen 0209 advances the processing to step S1305. In a case where a custom application is selected (YES in step S1304), the install code issuance screen 0209 advances the processing to step S1308.

In step S1305, the install code issuance screen 0209 displays an error message screen 1401 notifying the user that a custom application is not selected.

Figure 14:
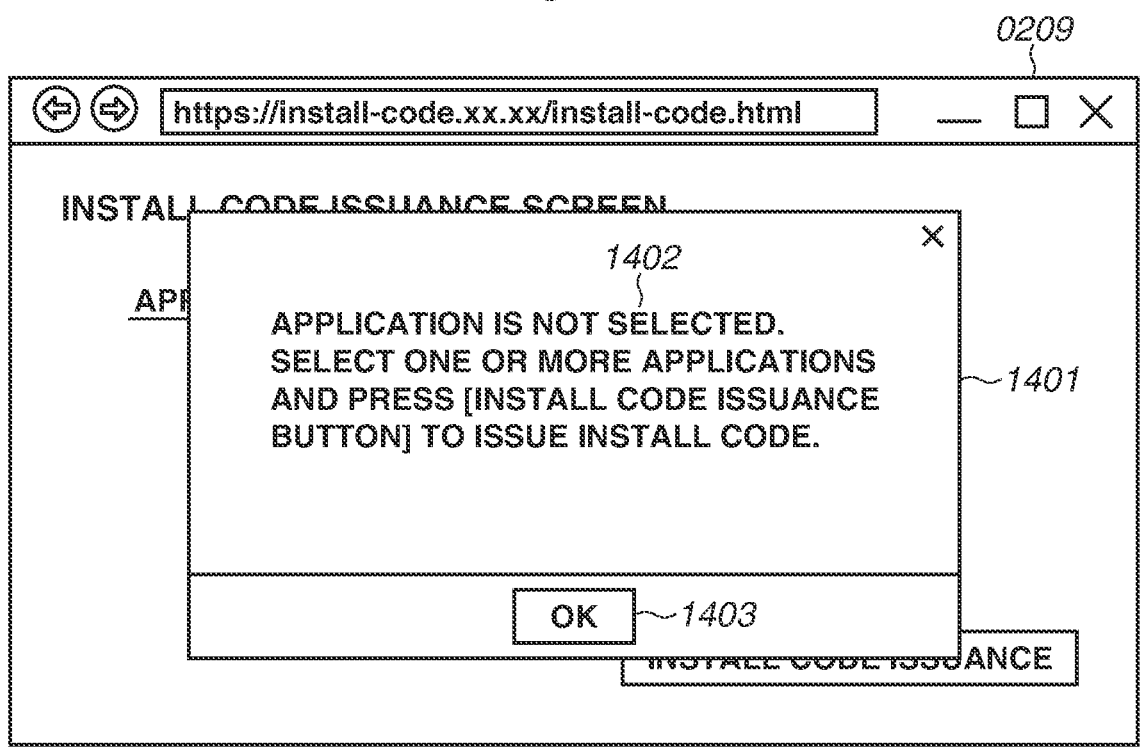
FIG. 14 is a diagram illustrating an example of an error message screen.

FIG. 14 is a diagram illustrating an error message screen example. The error message screen 1401 includes an error message 1402 and an OK button 1403. The error message 1402 is a message to prompt the user to select a custom application. In step S1306, the OK button 1403 is pressed, and then in step S1307, the install code issuance screen 0209 closes the error message screen 1401 and ends a series of processes. FIG. 14 illustrates a screen configuration in which the error message screen 1401 is displayed on the install code issuance screen 0209 when the install code issuance button 1203 is pressed, but another screen configuration can be employed. More specifically, a screen configuration in which the install code issuance screen 0209 transitions to a screen displaying the error message 1402, and the screen returns to the install code issuance screen 0209 in response to a pressing operation performed on the OK button 1403 can be employed.

In step S1308, the install code issuance screen 0209 transmits an install code issuance request to the install code issuance system 0214.

In step S1309, the install code issuance screen 0209 determines whether an install code has been received from the install code issuance system 0214. In a case where an install code has not been received (NO in step S1309), the install code issuance screen 0209 repeats the processing of step S1309. In a case where an install code has been received (YES in step S1309), the install code issuance screen 0209 advances the processing to step S1310. In step S1310, the install code issuance screen 0209 displays the received install code on a display screen and ends a series of processes.

Figure 15:
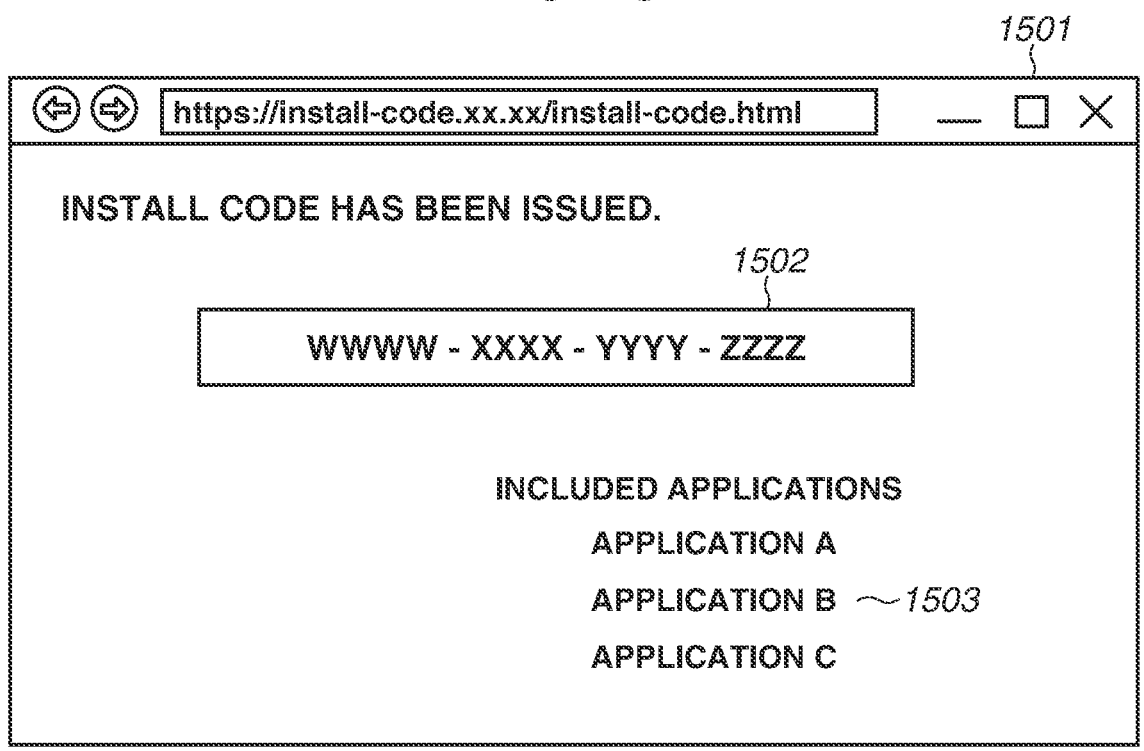
FIG. 15 is a diagram illustrating an example of an install code display screen.

FIG. 15 is a diagram illustrating an install code display screen example. On an install code display screen 1501, an install code 1502 generated by the install code issuance system 0214 is displayed. On the install code display screen 1501, a selected custom application list 1503 can also be displayed.

In FIG. 13, a procedure 1302 illustrates processing that is performed on the install code issuance system 0214.

In step S1311, the install code issuance system 0214 determines whether an install code issuance request has been received from the install code issuance screen 0209. In a case where an install code issuance request has not been received from the install code issuance screen 0209 (NO in step S1311), the install code issuance system 0214 repeats the processing of step S1311. In a case where an install code issuance request has been received from the install code issuance screen 0209 (YES in step S1311), the processing proceeds to step S1312.

In step S1312, the install code issuance system 0214 checks a custom application selected using the checkbox 1202.

In step S1313, the install code issuance system 0214 generates an install code corresponding to the selected custom application. The install code generated in step S1313 is a unique code that is based on information regarding the custom application checked in step S1312, and tenant information. FIG. 15 illustrates an example in which the install code 1502 including 16 digits is generated, but the number of digits can be increased or decreased.

In step S1314, the install code issuance system 0214 stores an install code management table 1601. FIG. 16 illustrates an example of information included in the install code management table 1601. On the install code management table 1601, install code information 1602 generated in step S1313, custom application information 1603 checked in step S1312, and install code expiration date information

1604 are managed. The install code expiration date information 1604 indicates an expiration date of a generated install code. An install code that has passed the expiration date is discarded. On the install code management table 1601, information regarding an installer package archive corresponding to an install code can also be held.

In step S1315, the install code issuance system 0214 transmits the install code generated in step S1313, to the install code issuance screen 0209 and ends a series of processes.

<Install of Custom Application>

The description registered in the authoring system 0101 is packaged (step S915), provided to the MFP 0203 as a custom application (step S911), and installed on the MFP 0203 (step S912). In a case where the custom application is installed, a reproduction application is executed on the MFP 0203, the description is read based on the script, and information designated in the description is reproduced.

Figure 7B:
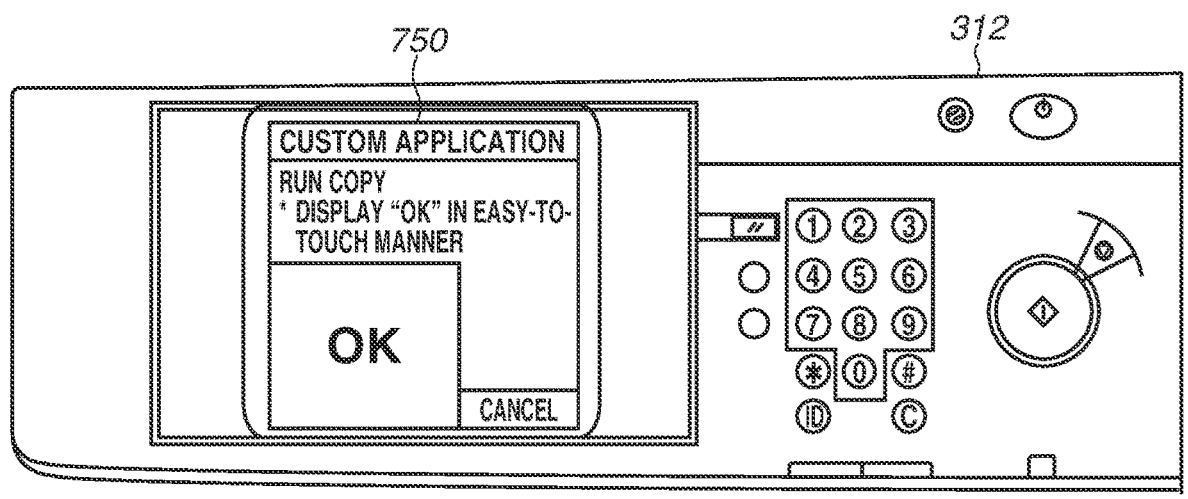
FIG. 7B is a diagram illustrating an execution screen of a custom application on the MFP.

An execution screen is displayed as illustrated in FIG. 7B. FIG. 7B is a diagram illustrating an execution screen 750 of a custom application on the MFP 0203. The execution screen 750 is the same screen as the screen displayed in the display region 701 when the description is edited. From the execution screen 750, it can be seen that the custom application normally operates.

Figure 10:
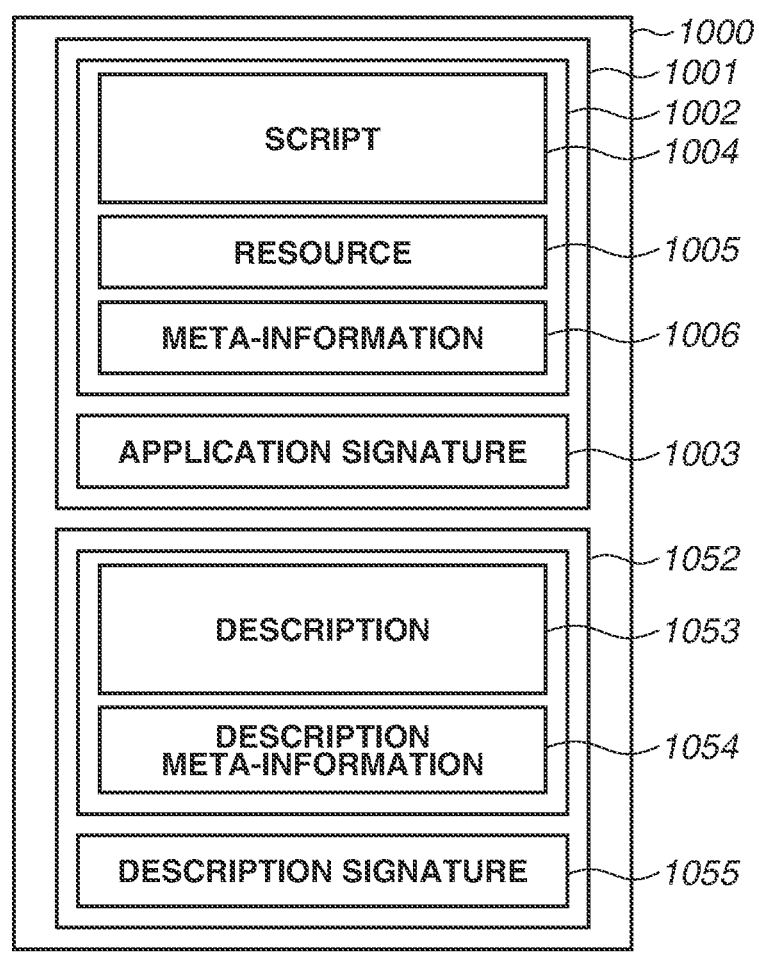
FIG. 10 is a diagram illustrating a data structure of the custom application.

First of all, a structure of an install package that is provided by the authoring system 0101 to the MFP 0203 will be described. FIG. 10 is a diagram illustrating a data structure of an install package.

An install package 1000 is package data including a signed description 1052 and a signed application 1001.

The signed application 1001 includes a reproduction application 1002 including a script 1004, a resource 1005, and meta-information 1006, and an application signature 1003. In the present exemplary embodiment, the same reproduction application as the reproduction application held by the description editor 604 is used.

On the other hand, the signed description 1052 includes a description 1053, description meta-information 1054, and a description signature 1055. The description 1053 is generated by the description editor 604, and is data defining a behavior of an application customized by the user. The details of the description 1053 has been described above with reference to FIGS. 11A and 11B. The description meta-information 1054 is information indicating an identifier (description identifier), version information, and an application name of a customized application. The description signature 1055 is signature data for assuring the integrity of the description 1053 and the description meta-information 1054. The description signature 1055 is generated using a signing key different from that of the application signature 1003. The signing key is held by the authoring system 0101, and the description signature 1055 as signature data is generated by the description signature affixation 0211.

Figure 17:
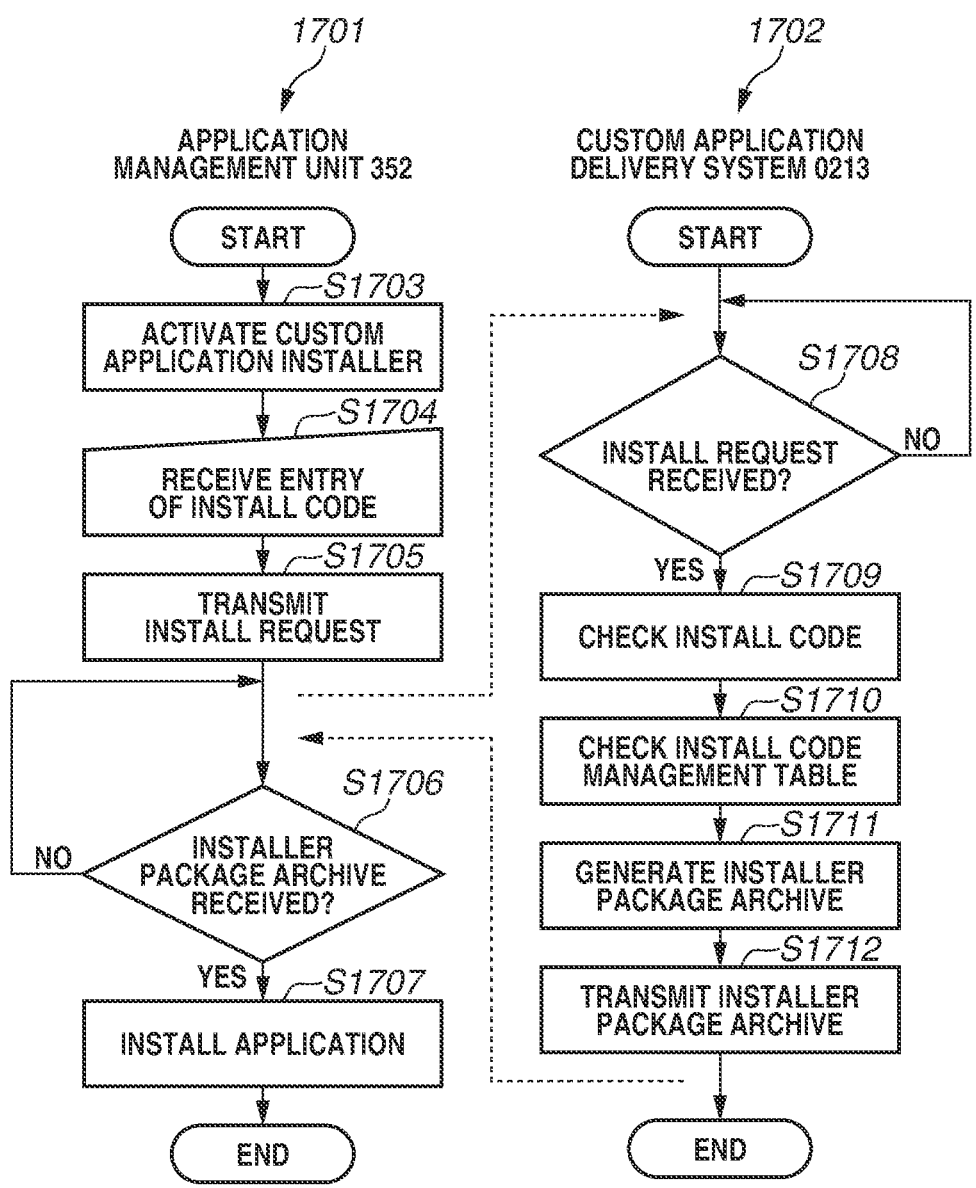
FIG. 17 is a diagram illustrating an install procedure of an application package.

Hereinafter, install processing of a custom application will be described in detail. FIG. 17 is a diagram illustrating an install procedure of an installer package archive. In FIG. 17, a procedure 1701 illustrates processing that is performed by the application management unit 352.

In step S1703, the application management unit 352 activates a custom application installer in response to an instruction from a system user.

Figure 18A:
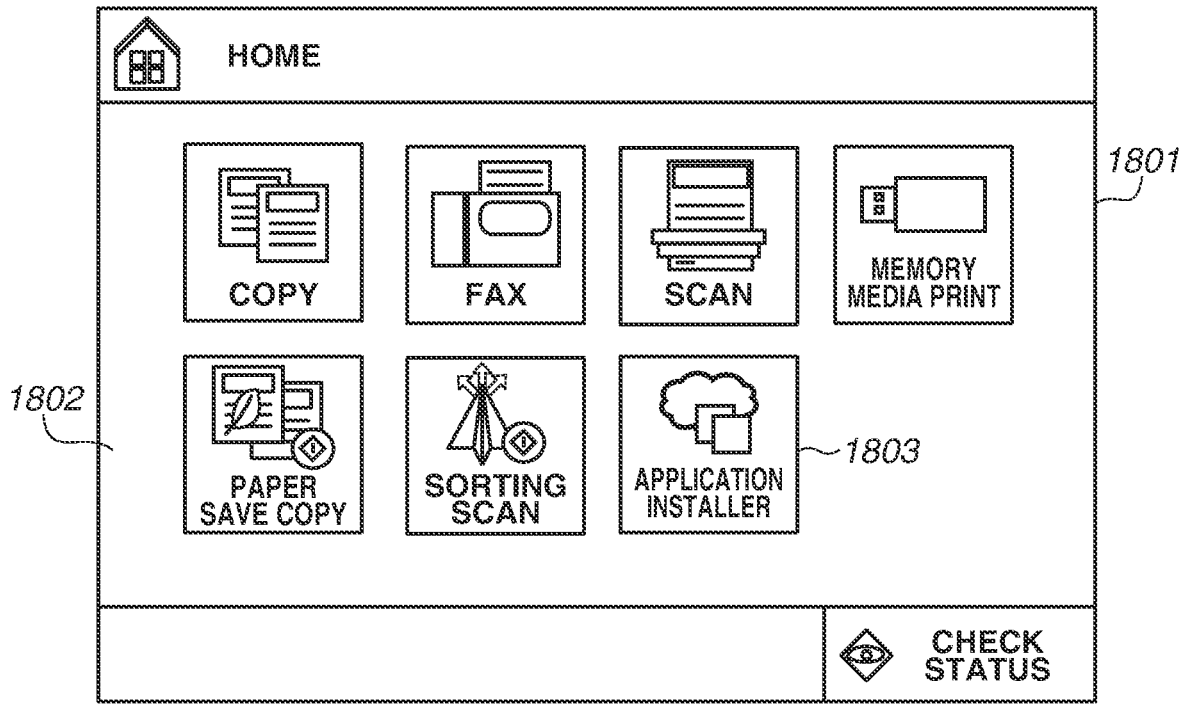
FIG. 18A is a diagram illustrating an icon of a custom application installer.
Figure 18B:
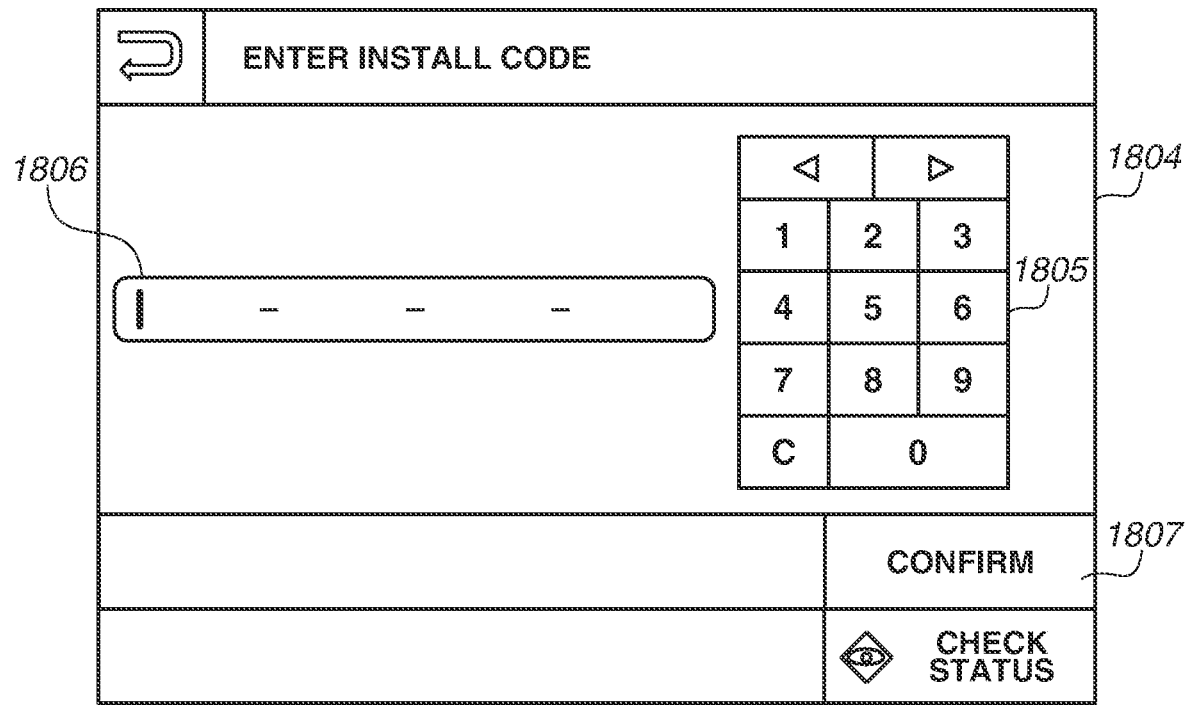
FIG. 18B is a diagram illustrating an install code entry screen.

In step S1704, the application management unit 352 receives the entry of the install code 1502. FIG. 18A is a diagram illustrating an icon of a custom application installer. FIG. 18B is a diagram illustrating an install code entry screen. In FIG. 18A, a home screen 1801 is a screen that is displayed on the operation unit 312. In response to a pressing operation performed on an icon displayed in an icon display region 1802, a function or an application of the MFP 0203 is executed. An icon 1803 of a custom application installer is provided on the home screen 1801. In a case where the icon 1803 is pressed, an install code entry screen 1804 is displayed. The install code entry screen 1804 includes a software numerical keypad 1805. By pressing the software numerical keypad 1805, the user of the MFP 0203 can enter an install code into an install code entry region 1806. The install code entry screen 1804 needs not be displayed on the operation unit 312. For example, the install code entry screen 1804 can be displayed on a screen of a client apparatus by the MFP 0203 providing a Web page.

In a case where a confirm button 1807 is pressed in a state in which the install code 1502 is entered in the install code entry region 1806, in step S1705, the application management unit 352 transmits an install request to the custom application delivery system 0213.

In step S1706, the application management unit 352 determines whether an installer package archive has been received from the custom application delivery system 0213. In a case where an installer package archive has not been received (NO in step S1706), the application management unit 352 repeats the processing of step S1706. In a case where an installer package archive has been received (YES in step S1706), the processing proceeds to step S1707. In step S1707, the application management unit 352 executes install processing of an application and ends a series of processes.

In FIG. 17, a procedure 1702 illustrates processing that is performed by the custom application delivery system 0213.

In step S1708, the custom application delivery system 0213 determines whether an install request has been received from the application management unit 352. In a case where an install request has not been received (NO in step S1708), the custom application delivery system 0213 repeats the processing of step S1708. In a case where an install request has been received (YES in step S1708), the processing proceeds to step S1709.

In step S1709, the custom application delivery system 0213 checks an install code included in the install request transmitted from the application management unit 352.

In step S1710, the custom application delivery system 0213 checks the requested install code using the install code management table 1601.

In step S1711, the custom application delivery system 0213 generates an installer package archive for one or more custom applications associated with the install code 1502.

In step S1712, the custom application delivery system 0213 transmits the generated installer package archive to the application management unit 352 and ends a series of processes.

The installer package archive can be preliminarily generated when an install code is generated in step S1313. In such a case, by managing a generated installer package archive using the install code management table 1601, it is possible to promptly transmit an installer package archive corresponding to an install code.

REMARKS

As described above, the authoring system 0101 provides an environment in which an application can be easily edited and delivered. This enables personnel, such as servicemen and technical salespersons, to create a custom application. It therefore becomes possible to promptly provide an application desired by a customer.

The authoring system 0101 also manages an install code of a custom application. A delivery destination of the custom application can be thus determined appropriately.

In the first exemplary embodiment, the description has been given of a case where a custom application delivered from the authoring system 0101 is executable on the MFP 0203. Nevertheless, depending on the performance, the device configuration, and the option of the MFP 0203, a part of a plurality of delivered custom applications might be normally unusable. Then, if a normally unusable custom application is installed on the MFP 0203, there arises an issue that a storage region of the MFP 0203 is occupied uselessly. In a second exemplary embodiment, the MFP 0203 that installs only normally usable custom applications will be described. Various configurations in the second exemplary embodiment are similar to those in the first exemplary embodiment except for an install configuration of custom applications. Thus, similar configurations are assigned the same reference numerals, and the redundant description will be omitted.

Figure 19:
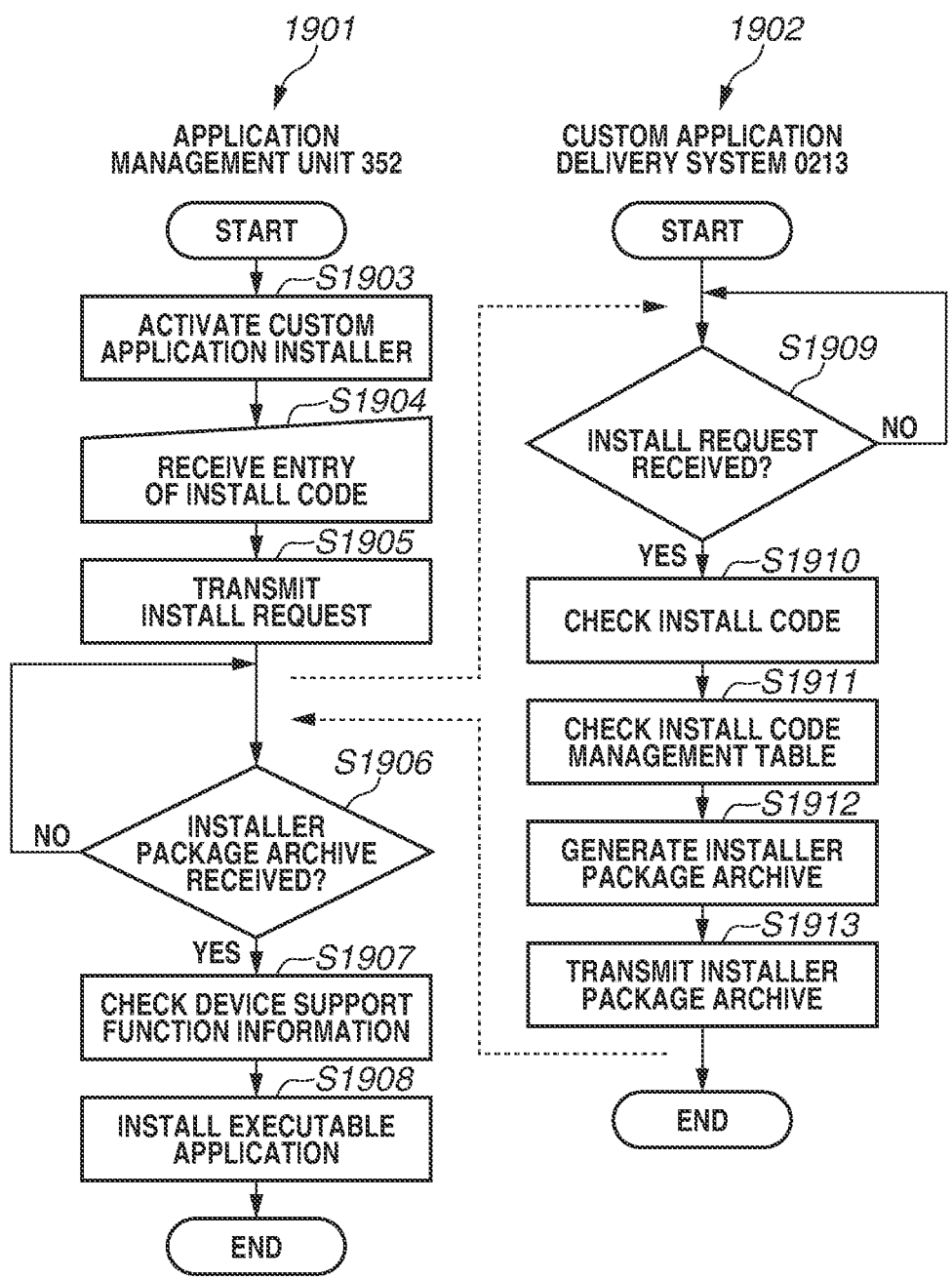
FIG. 19 is a diagram illustrating a procedure of checking a function of a device at the time of install.

FIG. 19 is a diagram illustrating a procedure of processing for installing of only a custom application executable on a device at the time of application install. Because the processing in steps S1903 to S1906 and the processing in steps S1909 to S1913 are similar to the processing in steps S1703 to S1706 and the processing in steps S1708 to S1712 of FIG. 17, the redundant description will be omitted.

In step S1907, the application management unit 352 checks support function information of a device. The support function information is information indicating a function executable on the device. Examples of device functions include a scan function and a facsimile function.

In step S1908, the application management unit 352 executes install processing of a custom application executable on the device, among custom applications included in the installer package archive. After that, the application management unit 352 ends a series of processes.

Whether a custom application is a custom application executable on the device is determined based on the meta-information 1006 of the custom application. The meta-information 1006 includes function information of the device that is necessary for executing the custom application. Whether the custom application is installable or not is determined by comparing the function information and the device support function checked in step S1907. Among custom applications included in the installer package archive, custom applications of which functions necessary for execution are not included in the device are excluded from an install target in step S1908. For example, in a case where an installer package including three custom applications is associated with one install code, and when the above-described install code is entered to a device that includes functions corresponding to two custom applications of the three custom applications, and does not include a function corresponding to the remaining one custom application, an installer package including three custom applications is received, and the two custom applications of them are installed but the remaining one custom application is not installed.

In the first exemplary embodiment, the description has been given of a case where a custom application delivered from the authoring system 0101 is executable on the MFP 0203. Nevertheless, depending on the performance, the device configuration, and the option of the MFP 0203, a part of a plurality of delivered custom applications might be normally unusable. Consequently, if a normally unusable custom application is delivered, communication traffic is increased. In a third exemplary embodiment, the authoring system 0101 that delivers only normally usable custom applications will be described. Various configurations in the third exemplary embodiment are similar to those in the first exemplary embodiment except for a delivery configuration of custom applications. Thus, similar configurations are assigned the same reference numerals, and the redundant description will be omitted.

FIG. 20 is a diagram illustrating a procedure of processing to be executed when only custom applications executable on a device are included in an installer package archive.

In FIG. 20, a procedure 2001 illustrates processing to be performed by the application management unit 352.

In step S2003, the application management unit 352 activates an application installer.

In step S2004, the application management unit 352 receives entry of the install code 1502. In response to the confirm button 1807 being pressed in a state in which the install code 1502 is entered in the install code entry region 1806, in step S2005, the application management unit 352 transmits an install request and device support function information to the custom application delivery system 0213.

In step S2006, the application management unit 352 determines whether an installer package archive has been received from the custom application delivery system 0213. In a case where an installer package archive has not been received (NO in step S2006), the application management unit 352 repeats the processing of step S2006. In a case where an installer package archive has been received (YES in step S2006), the application management unit 352 advances the processing to step S2007. In step S2007, the application management unit 352 executes install processing of an application and ends a series of processes.

In FIG. 20, a procedure 2002 illustrates processing that is performed by the custom application delivery system 0213.

In step S2008, the custom application delivery system 0213 determines whether an install request and device support function information have been received from the application management unit 352. In a case where an install request and device support function information have not been received (NO in step S2008), the custom application delivery system 0213 repeats the processing of step S2008. In a case where an install request and device support function information have been received (YES in step S2008), the custom application delivery system 0213 advances the processing to step S2009.

In step S2009, the custom application delivery system 0213 checks the install code transmitted from the application management unit 352.

In step S2010, the custom application delivery system 0213 checks the device support function information transmitted from the application management unit 352.

In step S2011, the custom application delivery system 0213 checks the requested install code using the install code management table 1601.

In step S2012, the custom application delivery system 0213 performs selection processing based on information regarding one or more custom applications associated with the install code 1502, and the device support function information checked in step S2010. In the selection processing, a custom application installable on the device is selected. Then, the custom application delivery system 0213 generates an installer package archive of the selected custom application.

In step S2013, the custom application delivery system 0213 transmits the generated installer package archive to the application management unit 352 and ends a series of processes.

Other Embodiment(s)

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)$^T$n, a flash memory device, a memory card, and the like.

An exemplary embodiment of the present disclosure can also be implemented by a circuit for implementing one or more functions (e.g., application specific integrated circuit (ASIC)). In addition, a storage described as an HDD in the exemplary embodiments can be replaced with a semiconductor storage, such as a solid state drive (SSD).

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-139942, filed Aug. 30, 2021, which is hereby incorporated by reference herein in its entirety.

What is claimed is:

1. An information processing system that provides an application to be executed on an image processing apparatus, the information processing system comprising:
one or more controllers configured to:
provide, as a first combination application, combination information regarding a reproduction application that reproduces a description file defining an operation procedure, and a first description file;
provide, as a second combination application, combination information regarding the reproduction application and a second description file; and
output a license code associated with the first combination application and the second combination application.

2. The information processing system according to claim 1, wherein a reproduction application included in the first combination application and a reproduction application included in the second combination application are applications of a same type.

3. The information processing system according to claim 1, wherein the first combination application is installed on the image processing apparatus based on package data including the reproduction application and the first description file.

4. The information processing system according to claim 3,
wherein the one or more controllers are further configured to create the first description file using an editing program that is executed on a web browser of an external terminal, and
wherein the editing program outputs screen information for receiving an editing operation of a user.

5. The information processing system according to claim 4, wherein the screen information includes information for performing an operation check of an application being edited.

6. The information processing system according to claim 4, wherein the screen information includes item information that can be added to an application being edited.

7. The information processing system according to claim 4, wherein the screen information includes information for editing a display item that is used by an application being edited.

8. The information processing system according to claim 4, wherein the editing program reproduces the first description file.

9. The information processing system according to claim 8, wherein a reproduction program based on a language that is a same language as that of the reproduction application and is a different language from JavaScript is used to reproduce the first description file.

10. The information processing system according to claim 9, wherein the reproduction program is a same program as the reproduction application.

11. The information processing system according to claim 9, wherein the different language is a Lua language.

12. The information processing system according to claim 9, wherein the editing program performs emulation processing for executing the reproduction program.

13. The information processing system according to claim 1, wherein the first description file is data described in a JavaScript Object Notation (JSON) format.

14. The information processing system according to claim 3, wherein the package data includes version information of the reproduction application.

15. The information processing system according to claim 1, wherein the image processing apparatus includes a printer configured to form an image on a sheet.

16. The information processing system according to claim 1, wherein the image processing apparatus includes a scanner configured to read an image from a document.

17. An information processing apparatus that provides an application to be executed on an image processing apparatus, the information processing apparatus comprising:
one or more controllers configured to:
provide, as a first combination application, combination information regarding a reproduction application that reproduces a description file defining an operation procedure, and a first description file;
provide, as a second combination application, combination information regarding the reproduction application and a second description file; and output a license code associated with the first combination application and the second combination application.

18. A non-transitory storage medium storing a program to be executed by an information processing apparatus that provides an application to be executed on an image processing apparatus, the program causing a computer to execute a method comprising:
   providing, as a first combination application, combination information regarding a reproduction application that reproduces a description file defining an operation procedure, and a first description file;
   providing, as a second combination application, combination information regarding the reproduction application and a second description file; and
   outputting a license code associated with the first combination application and the second combination application.

* * * * *